United States Patent
Boyapally et al.

(10) Patent No.: US 11,983,738 B2
(45) Date of Patent: *May 14, 2024

(54) METHOD AND SYSTEM FOR IDENTIFYING RECIPIENTS OF A REWARD ASSOCIATED WITH A CONVERSION

(71) Applicant: YAHOO AD TECH LLC, Dulles, VA (US)

(72) Inventors: Yugandhar Reddy Boyapally, Champaign, IL (US); Janith Kaiprath Valiyalappil, Urbana, IL (US); Sreeram Ramji, Champaign, IL (US); Rajesh Lalwani, Champaign, IL (US); Tianyuan Zhang, Urbana, IL (US)

(73) Assignee: YAHOO AD TECH LLC, Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,788

(22) Filed: Dec. 5, 2022

(65) Prior Publication Data

US 2023/0102214 A1    Mar. 30, 2023

Related U.S. Application Data

(63) Continuation of application No. 15/997,090, filed on Jun. 4, 2018, now Pat. No. 11,521,232.

(51) Int. Cl.
*G06Q 30/00* (2023.01)
*G06F 40/295* (2020.01)
(Continued)

(52) U.S. Cl.
CPC ....... *G06Q 30/0251* (2013.01); *G06F 40/295* (2020.01); *G10L 25/03* (2013.01); *G10L 25/48* (2013.01)

(58) Field of Classification Search
None
See application file for complete search history.

(56) References Cited

U.S. PATENT DOCUMENTS 9,881,301 B2    1/2018  Rajkumar et al.
11,501,330 B2   11/2022 Tsemekhman et al.
(Continued)

FOREIGN PATENT DOCUMENTS

WO    2005098714 A2    10/2005

OTHER PUBLICATIONS

Notice of Allowance dated Jun. 30, 2022 in U.S. Appl. No. 15/997,073.
(Continued)

*Primary Examiner* — Michael W Schmucker
(74) *Attorney, Agent, or Firm* — Venable LLP

(57) ABSTRACT

The present teaching relates to method and system for evaluating a conversion. The method extracts meta-information including a conversion parameter and a reward. The meta-information corresponds to a conversion associated with an advertisement displayed previously by a plurality of entities. The method receives a plurality of claims for the conversion from one or more entities, and selects a claim corresponding to an entity from the plurality of claims based on the conversion parameter and information included in the plurality of claims. Further, the method transmits information related to the selected claim.

20 Claims, 15 Drawing Sheets

(51) Int. Cl.
  *G06Q 30/0251* (2023.01)
  *G10L 25/03* (2013.01)
  *G10L 25/48* (2013.01)

(56) References Cited

U.S. PATENT DOCUMENTS

| | | |
|---|---|---|
| 2006/0212350 A1 | 9/2006 | Ellis et al. |
| 2007/0179881 A1 | 8/2007 | Lord |
| 2007/0260736 A1* | 11/2007 | Miller .................... G06Q 30/02 709/227 |
| 2008/0010143 A1* | 1/2008 | Kniaz .................... G06F 21/10 705/14.69 |
| 2011/0258056 A1 | 10/2011 | Ioffe et al. |
| 2013/0111519 A1 | 5/2013 | Rice et al. |
| 2016/0171525 A1* | 6/2016 | Ezra .................... G06Q 30/0225 705/14.12 |
| 2017/0026671 A1 | 1/2017 | Neumeier et al. |
| 2018/0048469 A1* | 2/2018 | Ateniese ................ H04L 9/085 |
| 2018/0075393 A1 | 3/2018 | Lovell |
| 2018/0075493 A1 | 3/2018 | Agarwal et al. |
| 2018/0181979 A1 | 6/2018 | Frank et al. |
| 2019/0034975 A1 | 1/2019 | Rizk et al. |
| 2019/0102837 A1 | 4/2019 | Smith et al. |
| 2019/0108499 A1 | 4/2019 | Liu |
| 2019/0190697 A1 | 6/2019 | Cunico et al. |
| 2019/0236214 A1 | 8/2019 | Kokernak |
| 2019/0370788 A1* | 12/2019 | Aronson ............ G06Q 20/0655 |
| 2019/0378162 A1 | 12/2019 | Goldberg et al. |

OTHER PUBLICATIONS

Nottorf, "Which clicks lead to conversions? Modeling user-journeys across multiple types of online advertising," International Conference on e-Business (ICE-B), 2013, pp. 1-12.
Yuan et al., "Internet Advertising: An Interplay among Advertisers, Online Publishers, Ad Exchanges and Web Users", Department of Computer Science, University College London, Jul. 2, 2012.
Office Action dated Apr. 20, 2021 in U.S. Appl. No. 15/997,042.
Pereira et al., "Blockchain-based platforms: Decentralized infrastructures and its boundary conditions", Technological Forecasting & Social Change, 2019, pp. 94-102, 146.
Goldfelder et al., "When the cookie meets the blockchain: Privacy risks of web payments via cryptocurrencies", pp. 1-19, Princeton University.
Notice of Allowance dated Dec. 5, 2022 in U.S. Appl. No. 15/997,042.
Chatwin, "An Overview of Computational Challenges in Online Advertising", 2013 American Control Conference (ACC), Jun. 17-19, 2013, pp. 5990-6007, Washington, DC, USA.
Office Action dated Oct. 5, 2023 in U.S. Appl. No. 18/170,728.
Office Action mailed Feb. 1, 2024 in U.S. Appl. No. 18/170,728.

\* cited by examiner

METHOD AND SYSTEM FOR IDENTIFYING RECIPIENTS OF A REWARD ASSOCIATED WITH A CONVERSION

CROSS-REFERENCE TO RELATED APPLICATIONS

The present application is a continuation of U.S. patent application Ser. No. 15/997,090, filed Jun. 4, 2018, which is related to U.S. patent application Ser. No. 15/997,042, filed Jun. 4, 2018, and U.S. patent application Ser. No. 15/997,073, filed Jun. 4, 2018, all of which are hereby incorporated by reference in their entireties.

BACKGROUND

1. Technical Field

The present teaching relates generally to advertisements. Specifically, the present teaching relates to method and system for evaluating conversions associated with an advertisement and identifying recipients of a reward associated with the conversion.

2. Technical Background

The advancement in the Internet has made it possible to sell and buy online products or services through the Internet. Advertisers typically distribute advertisements over the Internet in one of the media types, including text, audio, video, image, multi-media content, or any combination thereof. The advertisements are usually displayed across various platforms. Publishers that control the platforms acquire the advertisements from advertisers and publish them for users to view.

Upon viewing the advertisement, a user may interact with the advertisement and perform an action e.g., purchase a product, download an application, etc. Some actions may correspond to conversion events associated with the advertisement and are desirable because they provide a tangible return on investment for the advertiser. Thus, from the prospective of the advertiser, it is important to determine which publisher(s) provide a high rate of conversion events.

Traditionally, to determine which publishers are responsible for a particular conversion, the advertiser communicates with a central entity referred to as a third party attribution provider (3PP). The 3PP communicates with multiple publishers to identify the publisher(s) that were associated with a successful conversion related to the advertisement. The 3PP may carry out the task based on its own proprietary process to identify the publishers associated with the conversion. Such proprietary process may be configured with bias in favor of certain publishers over others. As a result, the advertiser may not receive factually accurate information as to which publisher(s) delivered more desirable return.

Thus, there is a need to develop a solution to identify publishers responsible for a conversion associated with an advertisement in a transparent and efficient manner.

SUMMARY

The teachings disclosed herein relate to methods, systems, and programming for advertising. More particularly, the present teaching relates to techniques of evaluating conversions associated with an advertisement, and identifying recipients of a reward associated with the conversions.

In one example, there is provided a method for evaluating a conversion. The method extracts meta-information including a conversion parameter and a reward. The meta-information corresponds to a conversion associated with an advertisement displayed previously by a plurality of entities. The method receives a plurality of claims for the conversion from one or more entities, and selects a claim corresponding to an entity from the plurality of claims based on the conversion parameter and information included in the plurality of claims. Further, the method transmits information related to the selected claim.

In a different example, there is disclosed a system for evaluating a conversion. The system includes a conversion parameter extractor configured to extract meta-information including a conversion parameter and a reward. The meta-information corresponds to a conversion associated with an advertisement displayed previously by a plurality of entities. The system includes an attribute extracting unit configured to receive a plurality of claims for the conversion from one or more entities, and an operational smart attribution evaluation package (SAEP) evaluation unit configured to select a claim corresponding to an entity from the plurality of claims based on the conversion parameter and information included in the plurality of claims. The system further includes a SAEP update unit configured to transmit information related to the selected claim.

Other concepts relate to software for implementing the present teaching of evaluating a conversion associated with an advertisement. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, there is disclosed a non-transitory machine-readable medium having information recorded thereon, wherein the information, when read by the machine, causes the machine to perform a method for evaluating a conversion. The method extracts meta-information including a conversion parameter and a reward. The meta-information corresponds to a conversion associated with an advertisement displayed previously by a plurality of entities. The method receives a plurality of claims for the conversion from one or more entities, and selects a claim corresponding to an entity from the plurality of claims based on the conversion parameter and information included in the plurality of claims. Further, the method transmits information related to the selected claim.

Additional novel features will be set forth in part in the description, which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
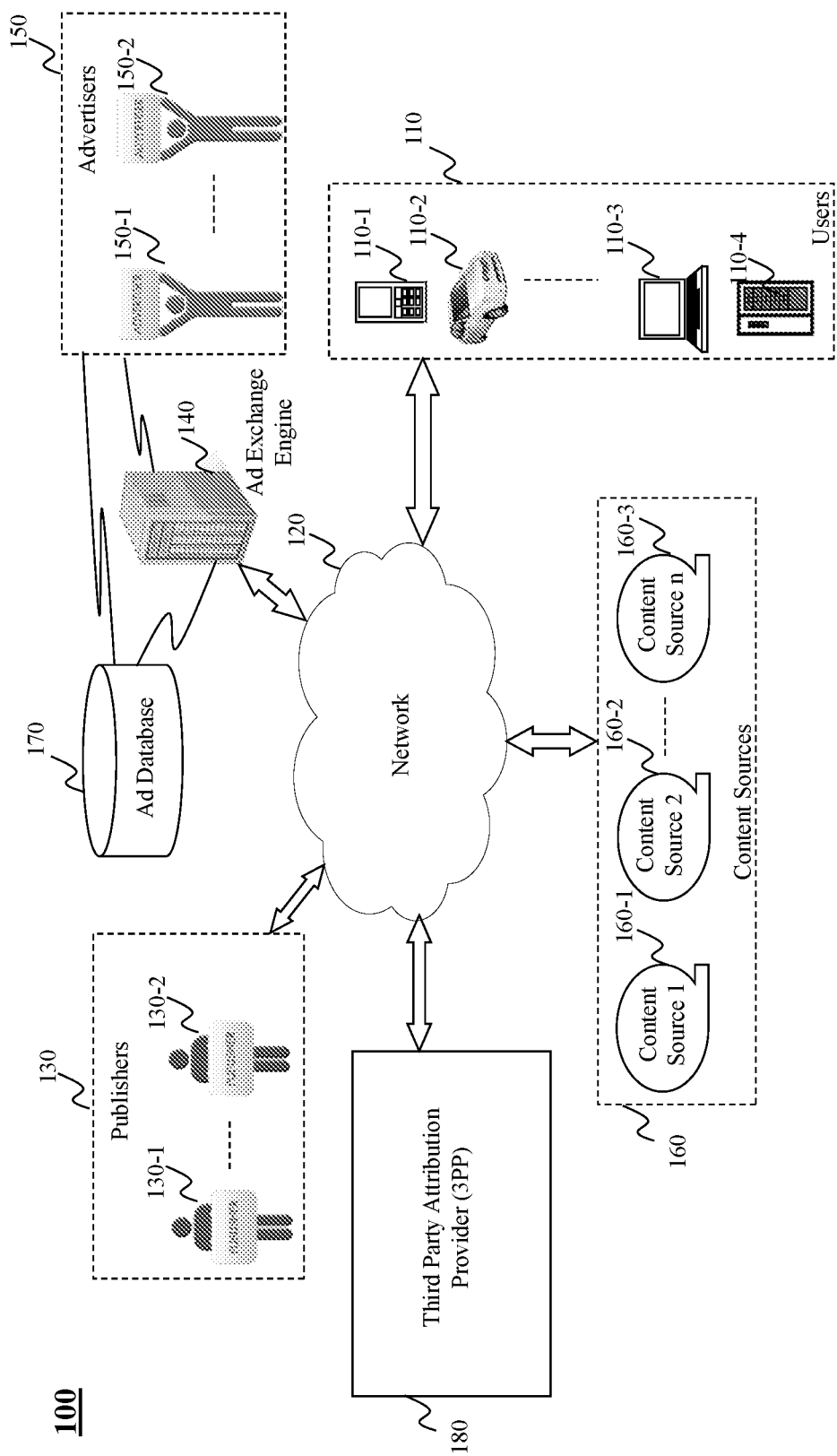
FIG. 1 (Prior Art) is a high-level depiction of an exemplary networked environment for evaluating conversions associated with advertisements.

Reference will now be made in detail to the embodiments of the present teaching, examples of which are illustrated in the accompanying drawings. While the present teaching will be described in conjunction with the embodiments, it will be understood that they are not intended to limit the present teaching to these embodiments. On the contrary, the present teaching is intended to cover alternatives, modifications, and equivalents, which may be included within the spirit and scope of the present teaching as defined by the appended claims.

In addition, in the following detailed description of embodiments of the present teaching, numerous specific details are set forth in order to provide a thorough understanding of the present teaching. However, it will be recognized by one of ordinary skill in the art that the present teaching may be practiced without these specific details. In other instances, well-known methods, procedures, components, and circuits have not been described in detail as not to unnecessarily obscure aspects of the embodiments of the present teaching.

Various embodiments in accordance with the present teaching provide a method and system related to advertising. More specifically, the method and system in various embodiments of the present teaching are related to evaluating sources of conversions associated with advertisements.

A publisher may provide an online service or content, e.g., at a website or a mobile application, to a user. The online service or content may be presented to the user with multiple advertisements in various formats such as brand advertisements e.g., at some fixed position(s) of a web page, or a stream advertisement in a content stream on a web page, where both the advertisements may be presented to the user at different or substantially the same time. Online advertisements may include banner ads, links to web pages, images, video, text, other multimedia formats, or the like.

An advertiser is typically interested in a return on investment (ROI) made on brand, streaming, and other types of advertisements. A metric for measuring ROI is advertisement conversion. Conversion refers to an action that is performed when an advertisement consumer (i.e., a user) interacts with the advertisement (for example, clicks a text ad or views a video ad) and may then further proceed to an action that is deemed valuable for business e.g., an online purchase. It is important for advertisers to know which publisher(s) provide them with higher ROI. In other words, advertisers are interested in identifying the publisher(s) that yield a higher rate of conversions. As defined herein, the process of linking a conversion to a click action or any other measureable action on the publishers end is referred to as an attribution process (i.e., evaluation of a conversion associated with an advertisement).

Additional features will be set forth in part in the description, which follows, and in part will become apparent to those skilled in the art upon examination of the following and the accompanying drawings or may be learned by production or operation of the examples. Further, throughout the present specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

FIG. 1 is a high-level depiction of an exemplary networked environment 100 for evaluating conversions associated with advertisements. The exemplary networked environment 100 includes users 110, a network 120, publishers 130, an ad exchange engine 140, advertisers 150, content sources 160, an ad database 170, and a third party attribution provider (3PP) 180. The network 120 in networked environment 100 may be a single network or a combination of different networks. For example, a network may be a local area network (LAN), a wide area network (WAN), a public network, a private network, a proprietary network, a Public Telephone Switched Network (PSTN), the Internet, a wireless network, or a virtual network, or any combination thereof. In one embodiment, the network 120 may be an online advertising network or an ad network, which connects advertisers 150 to publishers 130 or websites/mobile applications that want to host advertisements. A key function of an ad network is aggregation of ad-space supply from publishers and matching it with advertiser demand. An ad network may be a television ad network, a print ad network, an online (Internet) ad network, or a mobile ad network.

Users 110 may be of different types such as users connected to the network via desktop connections (110-4), users connecting to the network via wireless connections such as through a laptop (110-3), a handheld mobile device (110-1), or a built-in device in a motor vehicle (110-2). User(s) 110 may be connected to the network and able to access and interact with online content (provided by the publishers) through wireless technologies and related operating systems implemented within user-wearable devices (e.g., glasses, wrist watch, etc.). A user, e.g., the user 110-1, may send a request for online content to one of the publishers, e.g., 130-1, via the network 120 and receive content through the network 120.

Publishers 130 may correspond to an entity, whether an individual, a firm, or an organization, having publishing business, such as a television station, a newspaper issuer, a web page host, an online service provider, or a game server. For example, in connection to an online or mobile ad network, publishers 130-1 . . . 130-2 can be an organization such as USPTO.gov, a content provider such as CNN.com and Yahoo.com, or a content-feed source such as tweeter or blogs. In one embodiment, publishers 130 include entities that develop, support, and/or provide online content via mobile applications (e.g., installed on smartphones, tablet devices, etc.).

Referring to the above example, the content sent to user 110-1 may be generated by the publisher 130-1 based on the content sources 160. A content source may correspond to an entity where the content was originally generated and/or stored. For example, a novel may be originally printed in a magazine, but then posted online at a web site controlled by a publisher. The content sources 160 in the exemplary networked environment 100 include multiple content sources 160-1, 160-2 . . . 160-3.

When content is transmitted to the user 110-1, one or more advertising opportunities may be available for one or more advertisements to be presented with the content to the user 110-1. For an available advertising opportunity, a bid request may be sent out to advertisers to solicit bids (in monetary terms) with respect to the advertising opportunity. The bid request can be sent out by an ad server (not shown in FIG. 1) that manages the publisher 130-1. The ad server here serves as a supply side platform (SSP) for selling one or more advertisement opportunities by soliciting bids from one or more demand side platforms (DSP) and selecting a winning bid among the bids received from the DSPs. The bid request may be sent out to one or more DSPs.

The ad exchange engine 140 may serve as one DSP for buying one or more advertisement opportunities from an SSP, by executing a bidding process amongst advertisers 150 and submitting a bid to the SSP, after receiving a bid request from the SSP. An advertiser, e.g. 150-1, may correspond to an entity, whether an individual, a firm, or an organization, doing or planning to do (or otherwise involved in) advertising business. As such, an advertiser (150-1 . . . 150-2) may be an entity that provides product(s) and/or service(s) on a platform (e.g., websites, mobile applications, etc.) provided by a publisher (i.e., SSP).

Advertisers 150 may store their advertisements and bidding information at the ad database 170 or at the ad exchange engine 140 that serves as a buyer agent for the advertisers 150. Upon receiving a bid request for an advertisement opportunity, the ad exchange engine 140 may automatically run an online process to identify a winning bid based on information stored therein, without actually asking bids from each of the advertisers 150-1 . . . 150-2. Alternatively, the ad exchange engine 140 may also carry out a bidding process during which bids are solicited from different advertisers and a winning bid is then selected based on the bids. The winning bid selected by the ad exchange engine 140 is then sent to the SSP or the corresponding publisher. Referring to the above example, the SSP or the publisher 130-1 may then select a highest bid from bids received from one or more ad exchange engines and provide an advertisement associated with the highest bid along with the content to the user 110-1.

The ad database 170 includes advertisements associated with the advertisers 150. The ad database 170 may be connected to the ad exchange engine 140, the advertisers 150, and the network 120. Therefore, after the publisher 130-1 selects a winning bid and determines one or more advertisements associated with the winning bid, the publisher 130-1 may either retrieve the determined advertisements via the ad exchange engine 140 or directly from the ad database 170.

At least some of the advertisements, which are displayed by the various publishers, and viewed by the users, may result in conversions associated with the respective advertisements. As stated previously, advertisers are interested in identifying publisher(s) that yield a high rate of conversions. In order to identify such publishers, an advertiser transmits an advertisement evaluation request to the 3PP, 180. The 3PP 180 communicates with multiple publishers to identify the appropriate publisher(s) that were associated with a successful conversion related to the advertisement.

As depicted in FIG. 1, the 3PP is a central entity responsible for identifying the publisher(s) responsible for a conversion associated with the advertisement evaluation request. Such a framework has the following drawbacks: the 3PP 180 may execute its own proprietary process, without any supervision or control, to identify the publishers associated with the conversion. Such a process may be configured with a bias to favor certain publishers over others.

Accordingly, in what follows, there is provided by various embodiments of the present disclosure, an unbiased framework for evaluating the sources (e.g., publishers) of conversions associated with different advertisements. The proposed framework eliminates the 3PP of FIG. 1, and provides a de-centralized approach for identifying publishers that are responsible for the advertisement conversions in an accurate and transparent manner.

Figure 2:
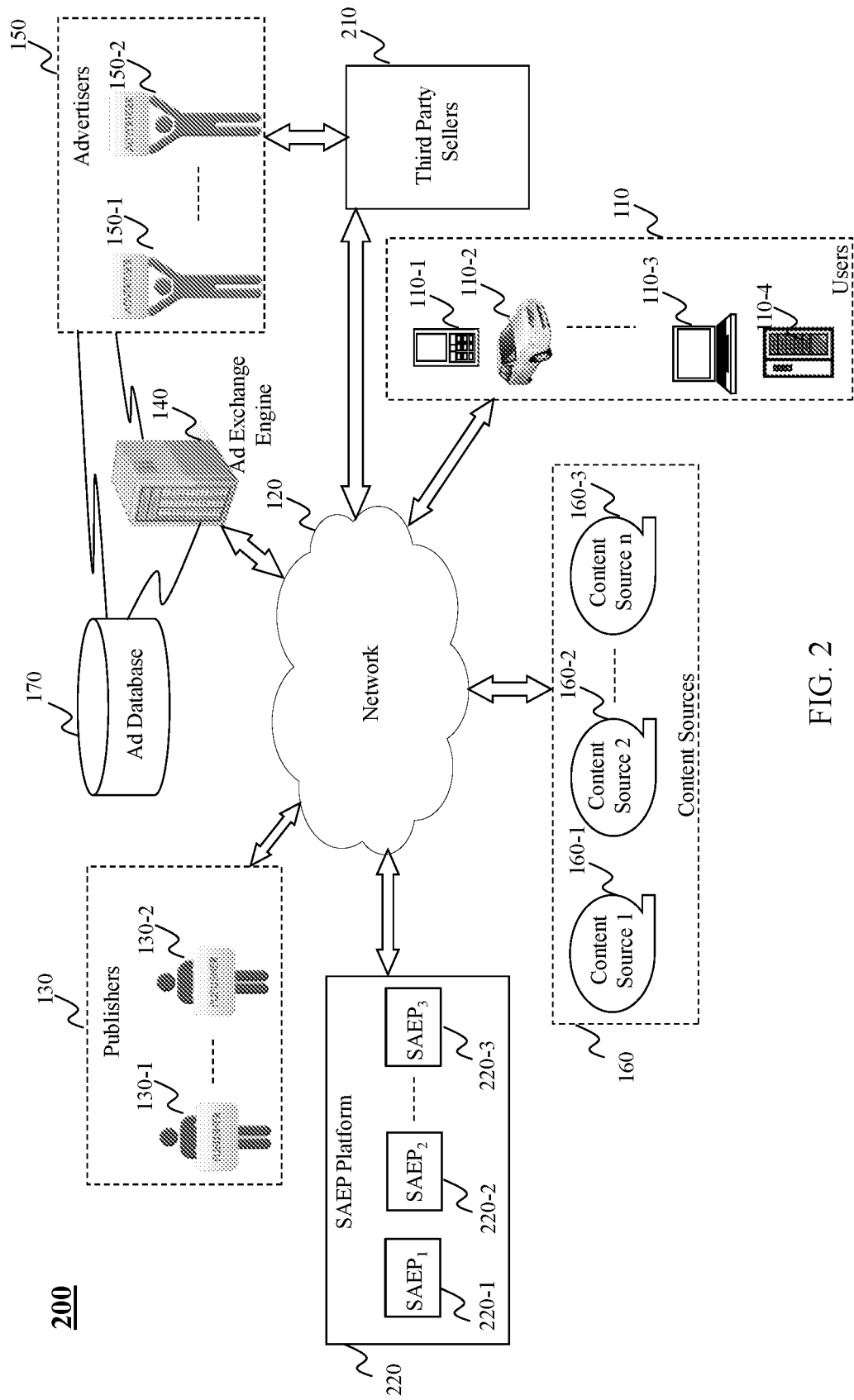
FIG. 2 is a high-level depiction of an exemplary networked environment for evaluating sources of conversions associated with advertisements, in accordance with an embodiment of the present teaching.

FIG. 2 is a high-level depiction of an exemplary networked environment 200 for evaluating sources of conversions associated with advertisements, in accordance with an embodiment of the present teaching. Similar to the networked environment 100 of FIG. 1, the exemplary networked environment 200 includes users 110, a network 120, publishers 130, an ad exchange engine 140, advertisers 150, content sources 160, and an ad database 170. Accordingly, for the sake of brevity, a description of these components is not repeated herein. However, in contrast to the networked environment 100, the networked environment 200 of the present teaching includes a smart attribution evaluation package (SAEP) platform 220, and third party sellers 210.

By one embodiment, the SAEP platform 220 serves as a mechanism for advertisers 150 to post (i.e. upload) it's generated SAEPs 220-1, 220-2, and 220-3, each of which is for evaluating one or more sources of conversions associated with an advertisement. The SAEP platform 220 may be made accessible to publishers 130. Thus, each publisher 130-1, 130-2, has an opportunity to access a particular SAEP e.g., 220-1 and provide a proof (e.g., an attribute or feature that is associated with the conversion) to the SAEP for claiming the respective conversion associated with the SAEP 220-1. In this manner, as opposed to utilizing a centralized party (e.g., 3PP in FIG. 1) for evaluating sources of conversions associated with advertisements, the present teaching provides a decentralized approach (i.e., not governed by a single entity) for evaluating sources of conversions. Details regarding the operation of the SAEP 220-1, and the interactions between the advertisers 150 and publishers 130 with the SAEP platform 220 are described next.

By one embodiment, the advertiser 150 may obtain information related to a conversion associated with an advertisement. For example, the advertiser 150 may obtain information of the conversion e.g., an application being downloaded on a mobile device of a user or a purchase of a product via a click operation on the advertisement, and the like. Upon obtaining information about the conversion, the advertiser 150 may generate a SAEP, say 220-1, and post the generated SAEP on the SAEP platform 220 for evaluation purposes. The information related to the conversion received by the advertiser 150 may be from a third party seller 210, a manufacturer that sold the product, or a service provider that allowed an application to be downloaded (i.e., a conversion). Note that the conversion may be an online conversion or an offline conversion.

It must be appreciated that generating and posting of the SAEP (220-1) as described herein is in no way limited to be performed only by the advertiser 150. Rather, any party that is aware of a conversion may potentially generate a SAEP and post it on the SAEP platform 220. This includes a third party seller 210, such as a third party service provider, a manufacturer, an online or offline vendor, etc., which obtains information related to an online or offline conversion associated with an advertisement. Moreover, by one embodiment, the SAEP platform 220 may be implemented as a Blockchain (e.g., a public Blockchain or a private Blockchain) that enables identifying, tracking, and sharing information associated with each SAEP (i.e., a block on the Blockchain) by the advertisers, publishers, and third party sellers in a distributed manner.

Figure 3A:
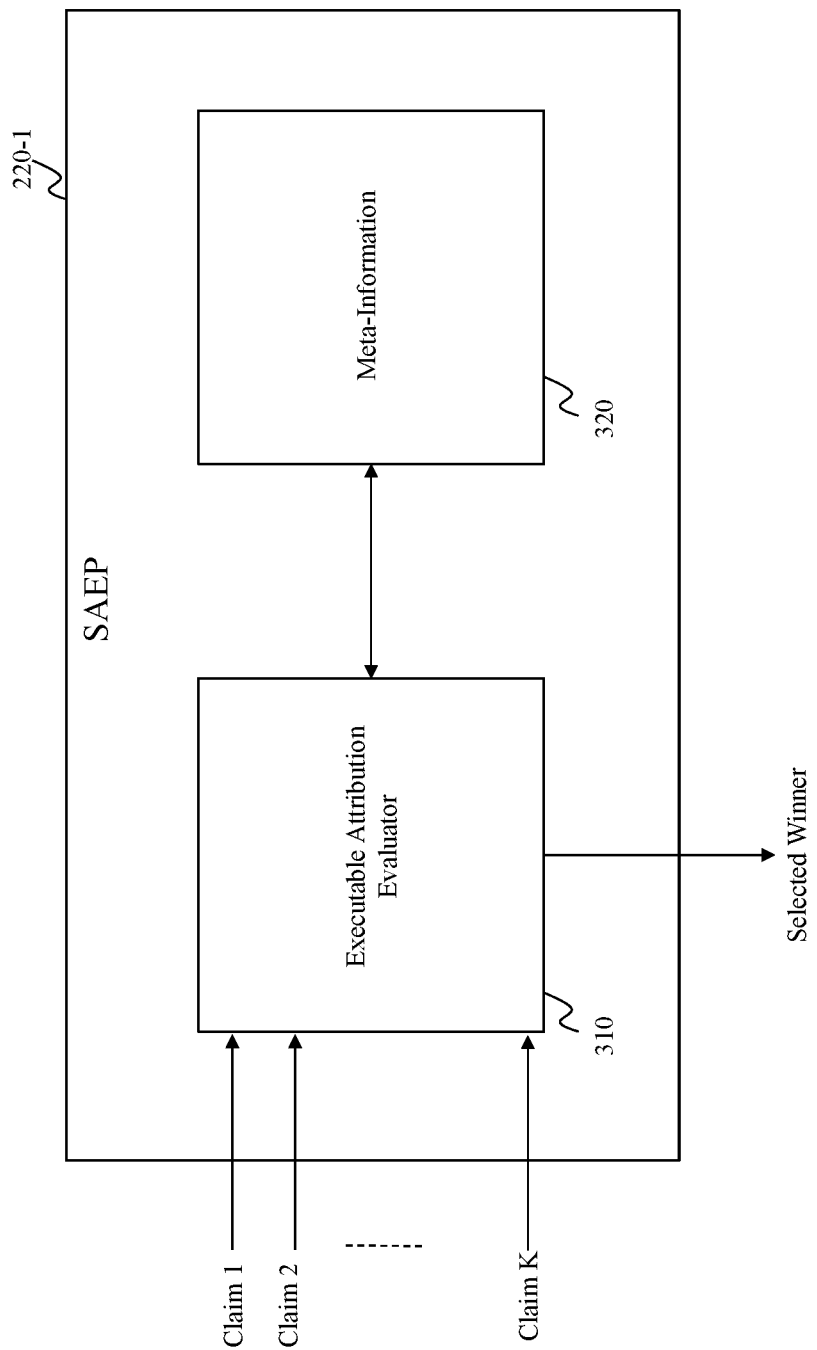
FIG. 3A illustrates an exemplary diagram of an operational smart attribution evaluation package (SAEP), in accordance with an embodiment of the present teaching.
Figure 3B:
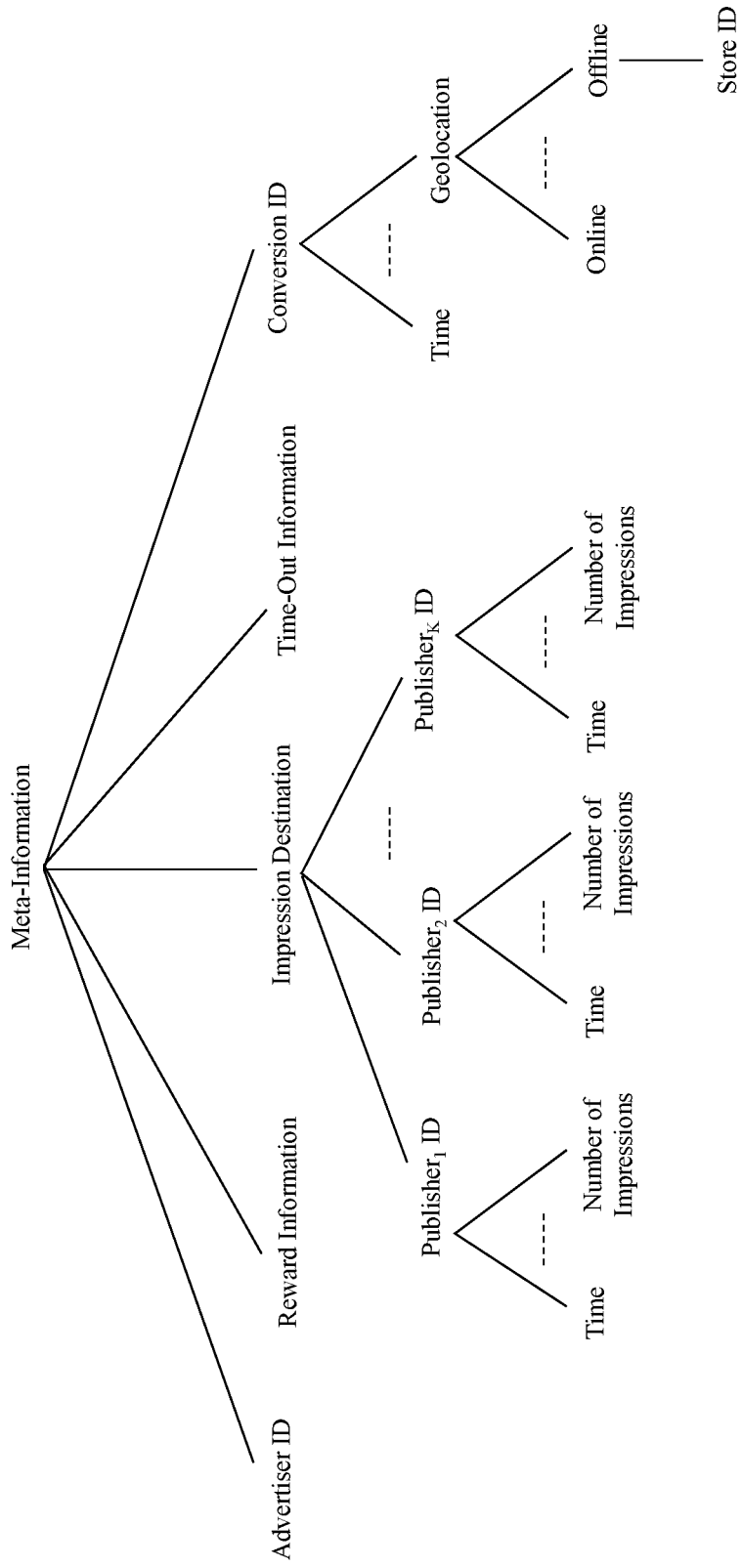
FIG. 3B illustrates meta-information included in a SAEP, in accordance with an embodiment of the present teaching.

FIG. 3A illustrates an exemplary diagram of a SAEP, according to an embodiment of the present teaching. As illustrated in FIG. 3A, the SAEP 220-1 includes an executable attribution evaluator 310 and meta-information 320. FIG. 3B illustrates exemplary content included in the meta-information 320, in accordance with an embodiment of the present teaching.

As shown in FIG. 3B, the exemplary types of meta-information included in the SAEP 220-1 includes an advertiser's ID, reward information, impression destination, a conversion ID, and optionally time-out information. The impression destination information may be further categorized based on publishers IDs. The information associated with each publisher may include, for instance, a time at which the respective publisher displays the advertisements, a number of impressions of the advertisements viewed and the like. In a similar manner, conversion associated with the advertisement may include information such as a time of conversation, a geo-location at which the conversion occurs, a type of conversion (e.g., an online or offline conversion), a store ID for an offline conversion (e.g., purchase of a product/commodity at a physical store).

Returning to FIG. 3A, the executable attribution evaluator 310 in the SAEP 220-1 is configured to perform the evaluation based on the meta-information 320 related to the conversion associated with the advertisement. Based on the meta-information related to the conversion, the executable attribution evaluator 310 is configured to evaluate various claims (Claims 1, 2, . . . , K) received from different publishers. The executable attribution evaluator 310 is further configured to identify one or more sources of the conversions (e.g., publishers responsible for the conversions) based on the meta-information 320 and the information (e.g., proof information) submitted in the claims from the publishers.

In operation, the executable attribution evaluator 310 receives a plurality of claims submitted by one or more other entities e.g., publishers that have previously displayed the advertisement, and who claim to be responsible for the conversion. The executable attribution evaluator 310 processes the received claims and the meta-information 320 to estimate which publisher(s) may be responsible for the conversion. In some embodiments, the executable attribution evaluator 310 may update, based on the selected responsible publisher, the meta-information 320. Details regarding the processing performed by the executable attribution evaluator 310 are described later with reference to FIGS. 7A and 7B.

Figure 4:
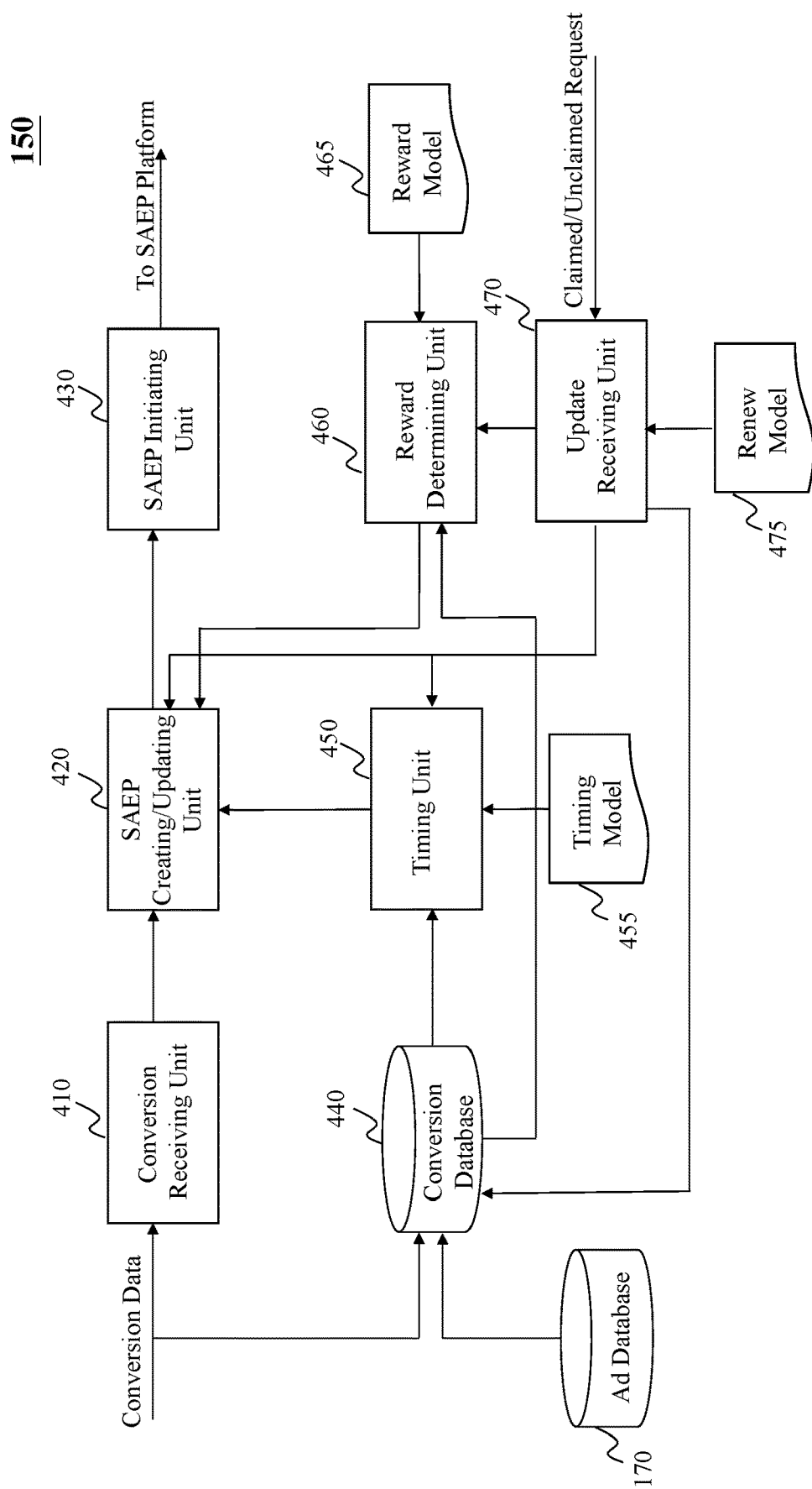
FIG. 4 illustrates an exemplary diagram of an advertiser that generates a SAEP, according to an embodiment of the present teaching.

FIG. 4 illustrates an exemplary diagram of an advertiser e.g., advertiser 150-1, which generates a SAEP (e.g. 220-1) based on a conversion event, and posts the generated SAEP 220-1 on the SAEP platform 220 according to an embodiment of the present teaching. The advertiser 150-1 in this embodiment includes a conversion receiving unit 410, a SAEP creating/updating unit 420, a SAEP initiating unit 430, a conversion database 440, a reward determining unit 460, an update receiving unit 470, and optionally a timing unit 450. Optionally, the advertiser may also include a timing model 455, a reward model 465, and a renew model 475, which are used by corresponding units of the advertiser as described below.

The conversion receiving unit 410 is configured to receive notification of a conversion associated with an advertisement. In some embodiments, the conversion received by the conversion receiving unit 410 may include conversion data related to the conversion. The conversion data may include a time at which the conversion occurred, a geo-location of the conversion, or any other parameters characterizing the conversion. In some embodiments, the conversion data may be received from a manufacturer that entrusted the advertiser in advertising its goods and encountered the conversion event (e.g., a user clicked on an ad to link to the entity to order the advertised goods), from a distributor of the goods advertised, or from a third-party service provider that monitors the conversions that either occurred online or offline. The conversion data upon being received, may be stored in the conversion database 440. Additionally, information related to the corresponding advertisement may be obtained from an ad database 170 and stored with the conversion data related to the advertisement in the conversion database 440.

The SAEP creating/updating unit 420 is configured to generate the SAEP for the conversion associated with the advertisement. As described herein, a SAEP includes the meta-information 320 and the executable attribution evaluator 310. To create the SAEP, the advertiser (e.g., 150-1) creates both the executable attribution evaluator 310 as well as the meta-information 320. As disclosed previously, the meta-information 320 includes various features associated with the conversion, including time of the conversion, location of the conversion, etc. In some embodiments, in creating the meta-information 320 in a SAEP, the SAEP creating/updating unit 420 may optionally include a time-out period and a reward associated with the SAEP. By one embodiment, the timing unit 450 generates the time-out period of the SAEP in accordance with a timing model 455, and the reward determining unit 460 generates the reward in accordance with a reward model 465. Thus, as shown in FIG. 4, the SAEP creating/updating unit 420 incorporates the time-out period and the reward information from the timing unit 450 and reward determining unit 460, respectively, in generating the SAEP. Once the SAEP is created by the SAEP creating/updating unit 420, it activates the SAEP initiating unit 430 to transmit the generated SAEP 220-1 to the SAEP platform 220 to be posted.

The update receiving unit 470 of the advertiser is configured to update the information stored in the conversion database 440 when the source(s) of the conversions are identified by the SAEPs posted on the SAEP platform. In operation, when the source (e.g., a publisher) of a conversion is identified, the SAEP that identified the source sends information related to the identified source of the conversion to the update receiving unit 470. In some situations, the source of a conversion may not be identified. For example, within a specified time-out period, no claim is considered as credible enough to conclude a match. Whether a matched source is identified for a conversion or not, the SAEP may always inform the advertiser of the outcome.

In the event of a successful identification of the source of the conversion, the update receiving unit 470 receives (from the SAEP) information of the publisher (e.g., publisher ID etc.) that is responsible for the conversion. The update receiving unit 470 may then transmit the information related to the publisher to the conversion database 440 to be stored.

In contrast, in the event of receiving a notification of an unsuccessfully claimed conversion, the update receiving unit 470 is configured to update at least one parameter included in the initially generated SAEP in accordance with a renew model 475. Specifically, the update receiving unit 470 is configured to update at least one of the time-out period and the reward included in the SAEP. By one embodiment, the renew model 475 may be configured to update operational parameters of the reward model 465 and/or the timing model 455, to generate updated values of the time-out period and/or the reward. The SAEP creating/updating unit 420 may trigger the SAEP initiating unit 430 to update the SAEP (posted on the SAEP platform) with the newly generated time-out period and/or reward information. Thereafter, the advertiser 150 awaits to receive evaluation information of the conversion associated with the advertisement from the SAEP. In some embodiments, the unsuccessful attempt to identify the publisher responsible for the conversion may be used to conclude the effort to locate the conversion source. In this case, the update receiving unit 470 may simply record in the conversion database 440 that no publisher for the conversion has been located.

It must be appreciated that although the generating and performing the attribution evaluation of a source of the conversion is provided with respect to an advertiser, it can also be applied to any third party that is not an advertiser, including a third party service provider that carries out the attribution evaluation either independently or on behalf of the advertiser. So long as such a third party has a channel to gain information about conversions and is in a position to reward a source of conversion for yielding such conversions, such a third party can implement the aspects of the teaching to achieve the same.

Figure 5:
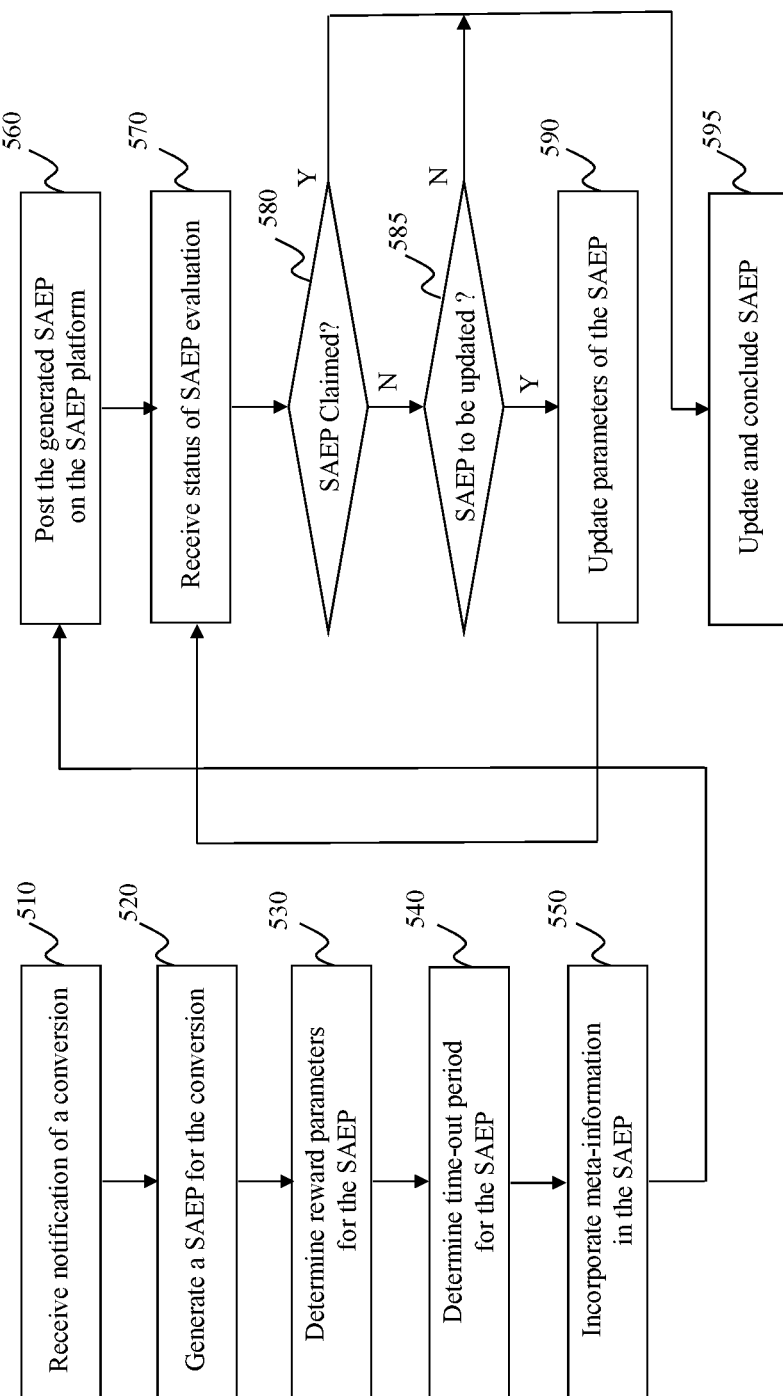
FIG. 5 is a flowchart of an exemplary process performed by an advertiser, in accordance with an embodiment of the present teaching.

FIG. 5 is a flowchart of an exemplary process performed by an advertiser in attribution evaluation, in accordance with an embodiment of the present teaching. As discussed herein, although the description herein refers to an advertiser, any third party may also perform such exemplary process to achieve attribution evaluation. According to the present teaching, at step 510, the advertiser, say 150-1, receives information regarding a conversion associated with an advertisement. Upon receiving such information, at step 520, the advertiser initiates the process of generating a SAEP to be posted on the SAEP platform for evaluation purposes. Note that the SAEP is generated corresponding to a conversion associated with an advertisement for identifying a source (publisher) at which the display of the advertisement yielded the conversion. Once posted on the SAEP platform, the generated SAEP evaluates various claims from corresponding publishers and identifies one or more claims as the credible sources responsible for the conversion.

At steps 530 and 540, the advertiser also determines a reward and optionally a time-out period that is to be incorporated in the SAEP. As discussed previously with reference to FIG. 4, the reward may be determined in accordance with a reward model and the reward may be characterized by various parameters determined based on the reward model. Similarly, the time-out period may be determined in accordance with a timing model. The time out period may be characterized by parameters such as a number of minutes, hours, or days, etc.

Further, at step 550 various meta-information such as the advertiser's ID, advertisement ID, etc., is incorporated into the SAEP. For instance, the advertiser's ID may be used by the SAEP for reporting the status of the attribution evaluation. At step 560, the generated SAEP is posted on the SAEP platform, where after the advertiser may wait for further communication from the SAEP regarding the updated status information on the attribution evaluation. At step 570, the advertiser receives a status of attribution evaluation from the SAEP, specifically from the executable attribution evaluator 310.

At step 580, it is determined whether the source of the conversion associated with an advertisement is successfully identified. If the source is successfully identified the SAEP is updated and concluded at step 595. However, if the source is not successfully identified, it is further determined at step 585, whether at least one parameter of the SAEP is to be updated. If no parameters of the SAEP are to be updated, the process of FIG. 5 is terminated by terminating and concluding the SAEP at step 595. If at least one parameter of the SAEP is to be updated, then the advertiser proceeds to update the at least one parameter of the SAEP at step 590. For example, by one embodiment, the time-out period of the SAEP and/or the reward associated with the SAEP may be updated at step 590. Upon updating the parameter(s) of the SAEP, the process loops back to step 570, where the advertiser awaits for receiving an updated status of the evaluation of the conversion.

In some embodiments, in concluding the SAEP, the update receiving unit 470 may update the conversion database using the status information received from the SAEP. For example, if there is a successful identification of a publisher, determined at step 580, the identified source (publisher) and the reward provided may be recorded in the conversion database as a conclusion. If there is no identification of a publisher and no SAEP update, the conversion database is updated with an indication that no publisher is identified and no reward is provided to conclude the evaluation. In some embodiments, at the conclusion, the SAEP may be deleted from the SAEP platform.

Figure 6A:
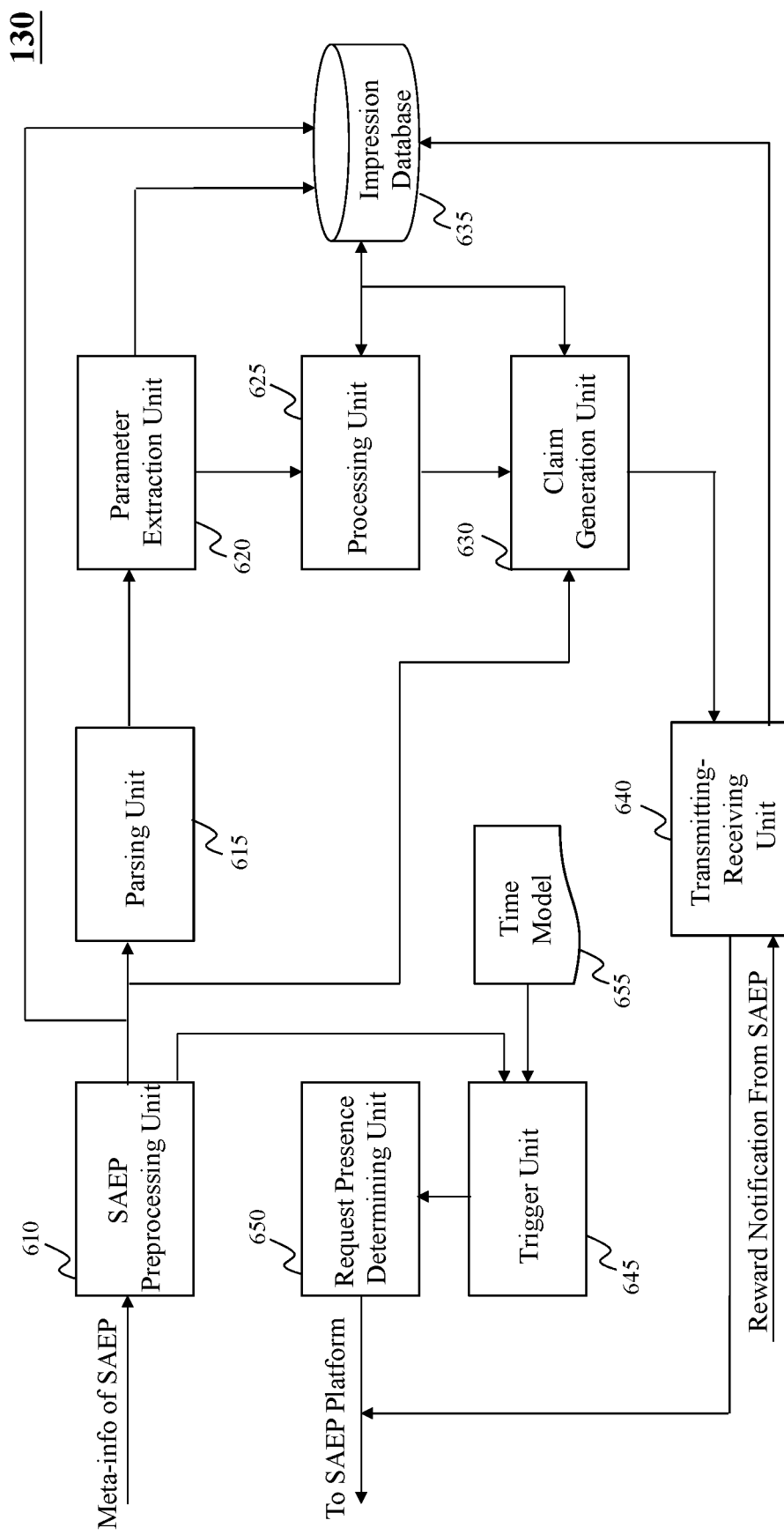
FIG. 6A illustrates an exemplary diagram of a publisher, according to an embodiment of the present teaching.

FIG. 6A illustrates an exemplary system diagram of a publisher in connection with claiming attributions to conversions, according to an embodiment of the present teaching. In this embodiment, the publisher 130 (e.g., publisher 130-1) includes a SAEP preprocessing unit 610, a parsing unit 615, a parameter extraction unit 620, a processing unit 625, a claim generating unit 630, an impression database 635, a transmitting-receiving unit 640, a trigger unit 645, a request presence determining unit 650, and a time model 655. The publisher is configured to access SAEPs posted on the SAEP platform and then make claims to certain SAEPs when the conversation parameters may present a match with the impressions of advertisements made by the publisher.

In operation, the SAEP preprocessing unit 610 accesses a SAEP posted on the SAEP platform to obtain and preprocess the meta-information included in the SAEP to determine whether to generate a claim for a conversion related to the SAEP. By one embodiment, the SAEP preprocessing unit 610 may process the meta-information to determine whether there is a match. Such a match may be determined based on, e.g., a publisher's ID, which can be used to inspect whether it is included in the meta-information as the impression destination (shown in FIG. 3B). If the publisher's ID is included in the meta-information as an impression destination, the SAEP preprocessing unit 610 transmits the meta-information to the parsing unit 615 for further processing.

The parsing unit 615 parses the meta-information to identify key parameters included therein. For example, the parameter extraction unit 620 may extract one or more conversion parameters from the meta-information, such as a timestamp parameter representing the time at which the conversion occurred, a geo-location parameter indicating where the conversion occurred, or any other parameter that characterizes the conversion associated with the SAEP. As disclosed herein, such conversion parameters are incorporated in the meta-information by the party that generates the SAEP (advertiser or a third party) for evaluating the attributor of the conversion. Such extracted conversion parameters are then transmitted to the processing unit 625.

Figure 6B:
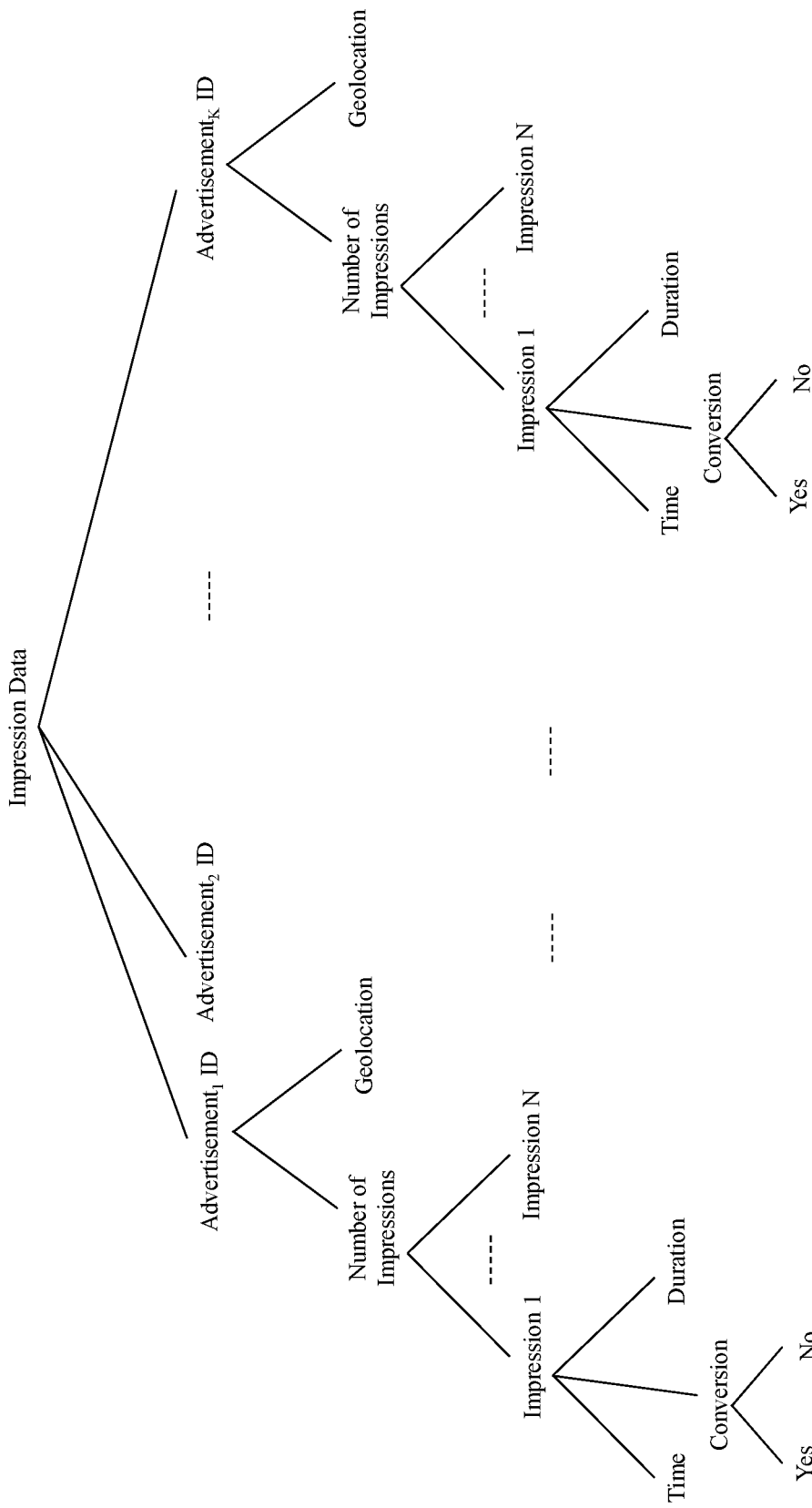
FIG. 6B illustrates impression data included in an impression database of a publisher, in accordance with an embodiment of the present teaching.

In order to generate a claim for the conversion, the processing unit 625 is configured to match the extracted conversion parameters with features/attributes associated with the impressions of advertisement made previously by the publisher. In some embodiments, the publisher maintains a plurality of features related to impressions of advertisements previously displayed in an impression database 635. For example, the impression data may include features such as a number of impressions for an advertisement and their respective time stamps, geo-locations of where the impressions of the advertisement were made (e.g., where the viewers are shown the impressions), a duration of each impression of the advertisement, and the like. This is illustrated in FIG. 6B. The exemplary features as shown in FIG. 6B are monitored and collected by the publisher and may be used in matching with the conversion parameters from the meta-information.

Returning to FIG. 6A, the processing unit 625 of the publisher is configured to match the extracted conversion parameters with impression features stored in the impression database 635 of the publisher. For example, if the extracted conversion parameter includes a time stamp representing a time instant of the conversion, the processing unit 625 may be configured to match the time stamp by checking whether there is any impression that has a time stamp close to the conversion time stamp. The impression time stamp(s) may not be exactly the same as the conversion time stamp because in general a conversion occurs after the impression is made. When a match in terms of time is found, additional match may need also to be performed. For example, the geo-location parameter from the meta-information may also be used to determine whether the impression(s) that corresponds to the conversion time is made at a geo-location that is the same or substantially similar to the geo-location of the conversion. If it is an online conversion, the geo-location likely will be the same. If it is an offline conversion, the geo-location of the conversion may be in the same vicinity as the geo-location of the impression (e.g., go to a local store to buy the advertised goods). If there is consistent matches across such important features/parameters, the publisher may determine that there is adequate evidence that it's display of the advertisement led to the conversion and, thus, a claim can be made. Upon determining a match, the claim generating unit 630 generates a claim to be sent to the SAEP and such a claim may incorporate the features associated with the matching impression(s) as evidence (i.e., a proof) to support the claim for the reward. The transmitting-receiving unit 640 then transmits the generated claim to the SAEP to be evaluated whether a reward is to be allocated to the publisher according to the claim.

By one embodiment, if the SAEP preprocessing unit 610 does not receive a notification of a SAEP posted on the SAEP platform, the SAEP preprocessing unit activates the trigger unit 645. The trigger unit 645 may then activate the request presence determining unit 650, in accordance with the time model 655, to poll the SAEP platform or request the presence of a posted SAEP on the SAEP platform. Upon determining the presence of a SAEP on the SAEP platform, the preprocessing unit 610 may access meta-information of the posted SAEP to determine whether a claim is to be generated as described above. It must be appreciated that although the above is described with respect to a publisher, in some embodiments, any third party that is entrusted by a publisher and provided with sufficient information related to the impressions made by the entrusting publisher can perform the above described tasks. In other words, any third party entrusted by a publisher can generate appropriate claims and communicate with SAEPs in order to seek rewards associated with successful conversions.

Figure 6C:
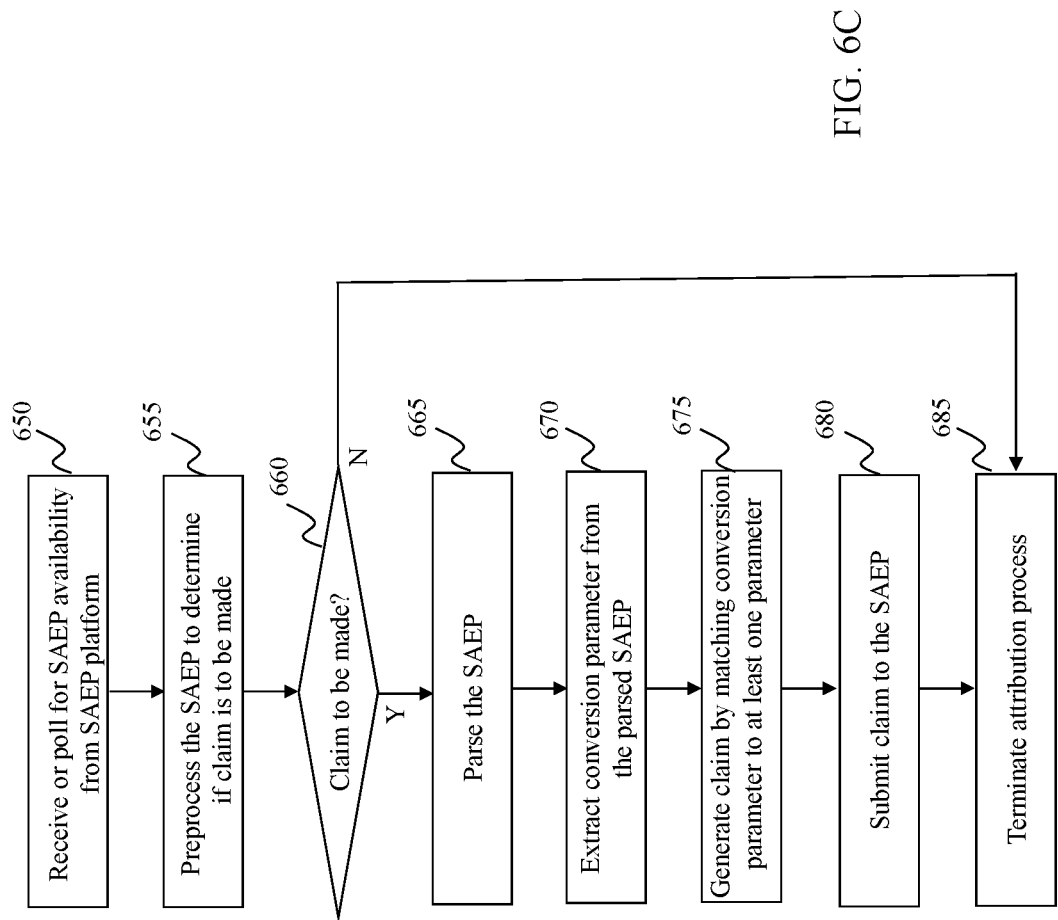
FIG. 6C is a flowchart of an exemplary process performed by a publisher, in accordance with an embodiment of the present teaching.

FIG. 6C is a flowchart of an exemplary process performed by a publisher, in accordance with an embodiment of the present teaching. In accordance with the exemplary process, at step 650, the publisher receives a notification from the SAEP platform or gains knowledge via other means (such as polling the SAEP platform 220) regarding the availability of a SAEP posted (either by an advertiser or by a third party) on the SAEP platform.

At step 655, the publisher accesses a SAEP posted on the SAEP platform to determine whether a claim for a conversion associated with the SAEP is to be generated. By one embodiment, the publisher may access the meta-information of the SAEP (as shown in FIG. 3B) to determine whether there is a match, e.g., determining whether the publisher's ID is included in the meta-information and/or whether the conversion geo-location is consistent with the impression locations. If a match is found to be sufficient, the publisher may determine to generate a claim for the conversion associated with the advertisement. In contrast, if no match is found, the publisher may determine not to generate a claim for the conversion associated with the advertisement.

At step 660, it is determined whether a claim is to be generated. If a claim is to be generated, then the publisher parses the SAEP at step 665. However, if a claim is not to be generated, the process of claiming the conversion associated with the advertisement is terminated (step 685).

Upon parsing the SAEP, at step 670, a conversion parameter is extracted from the SAEP. By one embodiment, the conversion parameter may be a time stamp corresponding to a time instant at which the conversion occurred. Alternatively, the conversion parameter may be a geo-location parameter corresponding to a geographical location where the conversion occurred. At step 675, the publisher generates a claim for the SAEP by matching the extracted conversion parameter to a feature (related to the advertisement) included in the impression database of the publisher. Further, at step 680, the publisher submits the generated claim to the SAEP, where after the attribution process is terminated at step 685.

Figure 7A:
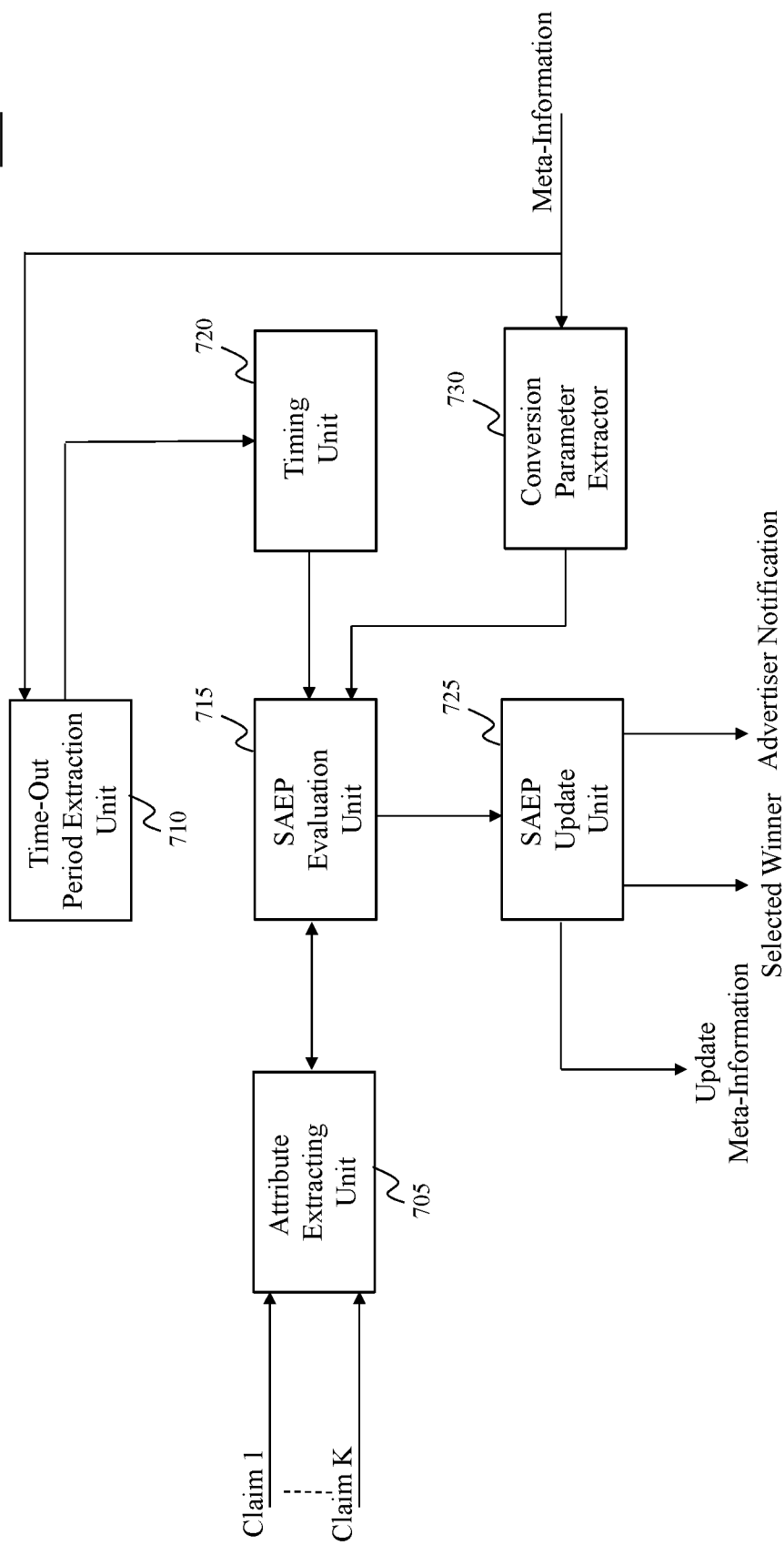
FIG. 7A illustrates an exemplary diagram of an attribution evaluator included in a SAEP, in accordance with an embodiment of the present teaching.

FIG. 7A illustrates an exemplary diagram of an executable attribution evaluator 310, in accordance with an embodiment of the present teaching. In this embodiment, the executable attribution evaluator 310 includes an attribute extracting unit 705, a SAEP evaluation unit 715, a SAEP update unit 725, a time-out period extraction unit 710, a timing unit 720, and a conversion parameter extractor 730.

The conversion parameter extractor 730 is configured to obtain met-information included in the SAEP, and extract a conversion parameter of the conversion associated with the advertisement. By one embodiment, the conversion parameter may be a time stamp corresponding to a time instant at which the conversion occurred, or a geo-location parameter corresponding to a geographical location where the conversion occurred. It must be appreciated that the conversion parameter may be any other parameter associated with the conversion. The conversion parameter extractor 730 transmits the extracted conversion parameter to the SAEP evaluation unit 715.

By one embodiment, the time-out period extraction unit 710 is configured to obtain the meta-information and extract a time-out period associated with the conversion. The time-out period extraction unit 710 transmits the extracted time-out period to the timing unit 720. By one embodiment, the timing unit 720 triggers the SAEP evaluation unit 715, and activates a clock (e.g., a countdown clock) having a magnitude equal to the time-out period. In this manner, the SAEP evaluation unit 715 instructs the attribution extraction unit 705 to receive claims (e.g., Claims 1, 2, . . . K) from the publishers until the expiration of the time-out period (i.e., before expiration of the countdown clock).

The attribute extracting unit 705 obtains a plurality of claims submitted by various publishers. Note that each publisher attempts to claim the conversion associated with the advertisement, by generating (and transmitting to the SAEP) a claim, which includes a proof e.g., an attribute or a feature associated with the conversion. Upon receiving all the claims, the SAEP evaluation unit 715 determines a winning claim (from the plurality of claims) based on the extracted conversion parameter that is obtained from the conversion parameter extractor 730, and the features included in the plurality of claims that are submitted by the publishers.

Specifically, the SAEP evaluation unit 715 is configured to compare the extracted feature from each claim with the conversion parameter. The SAEP evaluation unit 715 is further configured to determine a winning claim, defined herein as the claim that has an exact match (or a closest match) between the extracted feature and the conversion parameter. In this manner, the SAEP evaluation unit 715 determines the winning claim and identifies the publisher associated with the winning claim. For instance, consider that the conversion parameter is a time stamp corresponding to the time instant at which the conversion occurred. In this scenario, the SAEP evaluation unit 715 compares for each claim, the extracted feature (i.e., time parameter which is submitted as a proof in the claim by the publisher) with the time stamp conversion parameter to determine the winning claim.

Upon determining the winning claim, the SAEP update unit 725 is configured to communicate to the advertiser, relevant information (e.g., publisher's ID etc.) of the publisher associated with the winning claim. Moreover, the SAEP update unit 725 allocates the reward associated with the SAEP to the publisher associated with the winning claim. Additionally, by one embodiment, the SAEP update unit 725 is configured to update the meta-information associated with each publisher. For instance, referring to FIG. 3B, the SAEP update unit 725 may update meta-information including features such as time, number of impressions, etc. that are submitted as proof in the claims by the respective publishers.

Figure 7B:
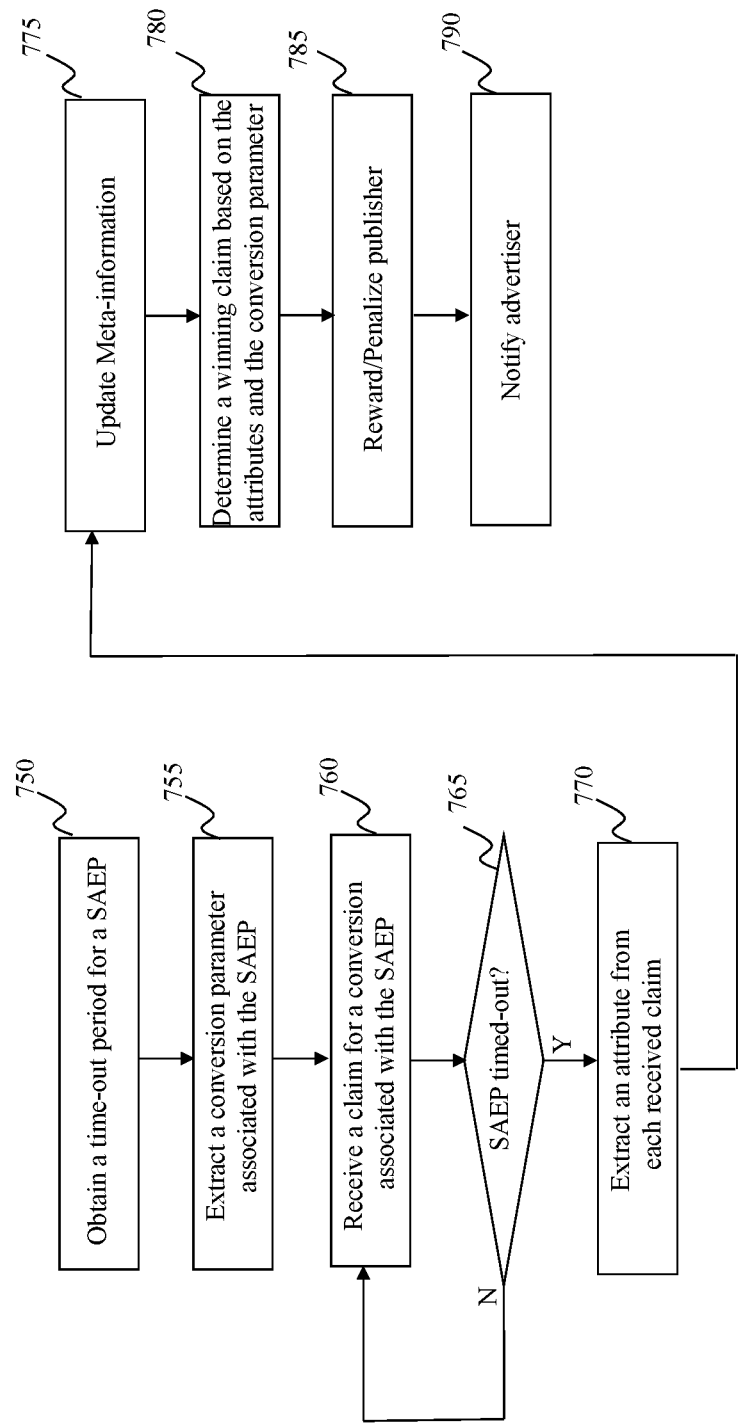
FIG. 7B is a flowchart of an exemplary process performed by an attribution evaluator of a SAEP, in accordance with an embodiment of the present teaching.

FIG. 7B is a flowchart of an exemplary process performed by an attribution evaluator, in accordance with an embodiment of the present teaching. For example, the process as depicted in FIG. 7B may be performed by the executable attribution evaluator 310. At step 750, the attribution evaluator obtains a time-out period associated with the SAEP. At step 755, the attribution evaluator extracts a conversion parameter associated with the SAEP. For instance, the attribution evaluator may extract the time out period as well as the conversion parameter from meta-information included in the SAEP. As stated previously, the conversion parameter may be a time stamp corresponding to a time instant at which the conversion occurred. Alternatively, the conversion parameter may be a geo-location parameter corresponding to a geographical location where the conversion occurred.

At step 760, the attribution evaluator receives a claim (e.g., from a publisher) for the conversion associated with an advertisement. At step 765, it is determined whether the time out period of the SAEP is expired. If the time-out period has not expired, the process loops back to step 760, where the attribution evaluator receives additional claims (if any) for the conversion associated with the advertisement. If the time-out period of the SAEP has expired, the attribution evaluator at step 770 extracts a feature from each received claim. Note that the feature in each claim corresponds to a proof (i.e. the attribute) submitted by the respective publisher to claim the conversion associated with the advertisement.

At step 775, the attribution evaluator updates the meta-information associated with each publisher. For example, referring to FIG. 7A and FIG. 3B, the SAEP update unit 725 may update meta-information including features such as time, number of impressions, etc. that are submitted to the SAEP by the respective publishers.

At step 780, the attribution evaluator determines a winning claim based on matching the extracted conversion parameter with the features (i.e., attributes) included in each of the claims submitted by the publishers. Further, at step 785, the attribution evaluator rewards the publisher corresponding to the determined winning claim. Specifically, as stated previously, the reward included in the SAEP is allocated to the publisher associated with the winning claim.

By one embodiment, the attribution evaluator may penalize certain publisher(s) based on comparisons of the features submitted by the publishers in the respective claims with the conversion parameter. For instance, consider that the conversion parameter included in the SAEP is a time instant corresponding to the time of occurrence of the conversion. Further, consider that the features (i.e. attributes) submitted in the respective claims by the publishers are time stamps corresponding to the time instances that the publishers detected or observed conversion(s) associated with the advertisement. By one embodiment, if the time stamps submitted by certain publishers are not within a threshold amount of time with respect to the time instant conversion parameter included in the SAEP, then the attribution evaluator may penalize those publishers e.g., a monetary penalization. In this manner, the attribution evaluator may discourage certain publishers from submitting claims to a conversion to which those publishers are likely not the source of conversion. Moreover, in doing so, it must be appreciated that the processing requirements of the attribution evaluator may also be reduced, as publishers would refrain from submitting unnecessary claims to the SAEP.

Further, the attribution evaluator at step 790 notifies the advertiser regarding the evaluation of the conversion associated with the advertisement. Specifically, if the source of the conversion (e.g., a publisher) is successfully identified, then the attribution evaluator notifies the advertiser with information such as the publisher's ID, number of impressions detected, etc. In contrast, if no source of the conversion is identified by the attribution evaluator, the same may be reported to the advertiser. Upon notifying the advertiser information pertaining to the evaluation of conversion, the process as depicted in FIG. 7B terminates.

Figure 8:
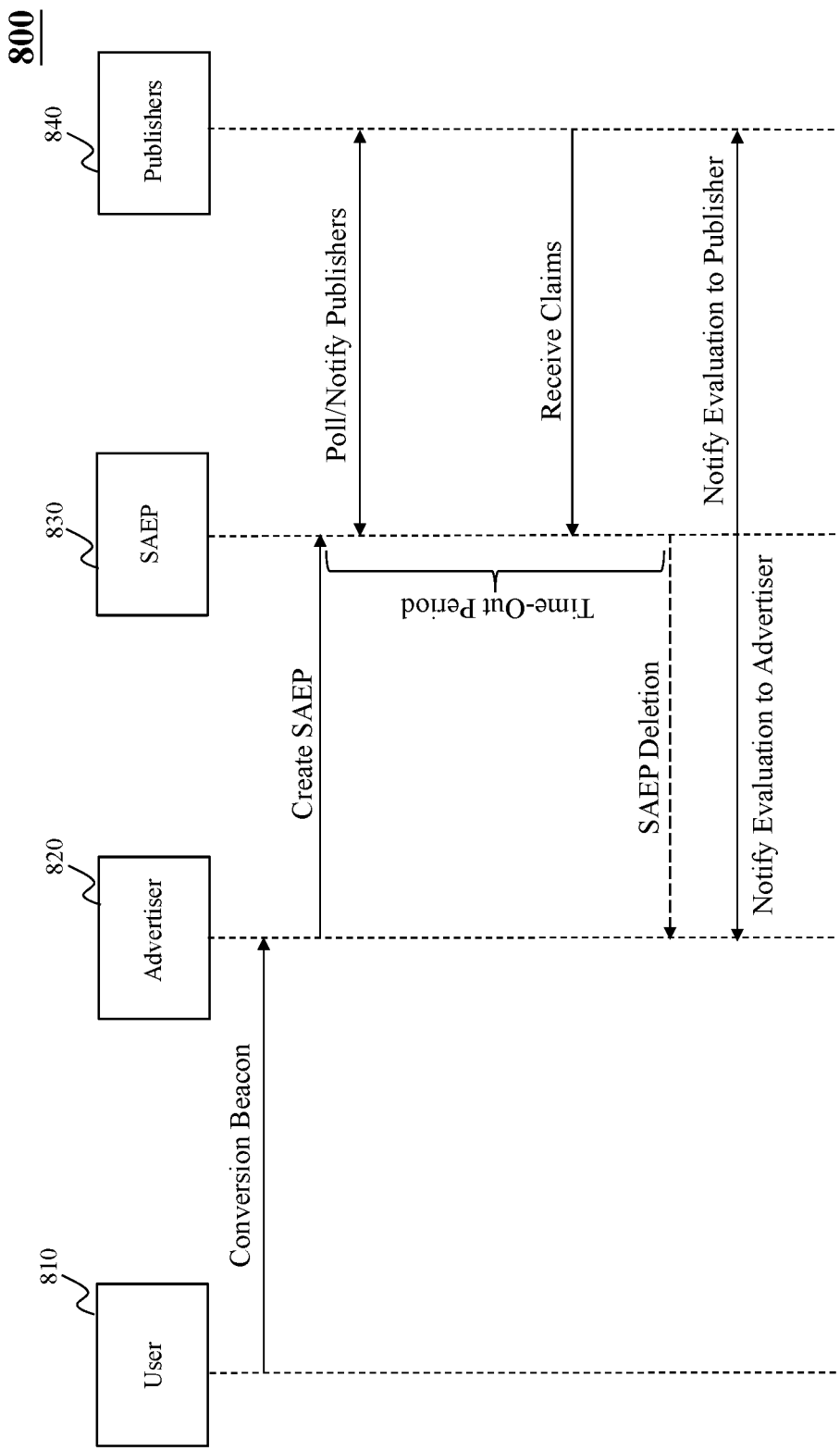
FIG. 8 illustrates an exemplary protocol scheme of an attribution process, in accordance with an embodiment of the present teaching.

FIG. 8 illustrates an exemplary protocol scheme 800 of an attribution process, in accordance with an embodiment of the present teaching. As stated previously, the process of linking a conversion to a click operation (or any other measureable action) performed on an advertisement is referred to herein as an attribution process. In this exemplary scheme, there comprises four parties involved in the attribution process, including a user 810, an advertiser 820, SAEP 830, and publishers 840. For sake of convenience, the conversion with respect to the attribution process of FIG. 8 is assumed to be a purchase of a product by the user 810.

Consider the scenario where the user 810 views an advertisement provided by the advertiser 820 on a mobile device. The user 810 may perform a click operation on the advertisement, and thereafter purchase the product associated with the advertisement. The purchase of the product by the user 810 results in a conversion associated with the advertisement. As stated previously, the advertiser 820 may be notified of such a conversion by a third party service provider. As shown in FIG. 8, the conversion event (i.e., the purchase of the product by the user) is notified to the advertiser 820 e.g., via a conversion beacon signal.

When the advertiser 820 is notified of the conversion, the advertiser 820 generates a SAEP 830. The generated SAEP is posted on a SAEP platform. Thereafter, either the SAEP may notify the publishers 840 of the presence of the SAEP on the platform or alternatively, the publishers 840 may poll the platform to request the presence of a newly posted SAEP.

Within a time-out period associated with the SAEP, the SAEP receives claims from a plurality of publishers. In the event that the SAEP 830 receives no claims from any publishers, the SAEP may be deleted from the SAEP platform, or alternatively, by one embodiment, the time-out period of the SAEP may be extended to allow additional time for the publishers to submit claims to the SAEP.

The SAEP 830 evaluates each claim received from the publishers and determines a winning claim. As stated previously, the SAEP determines the winning claim based on a conversion parameter included in the SAEP 830 and the features (i.e. proofs) included in the each claim submitted by the publishers. The SAEP 830 further notifies the publisher associated with the winning claim and allocates a reward included in the SAEP 830 to the corresponding publisher. Additionally, the SAEP 830 notifies the advertiser 820 of a successful completion of the attribution evaluation process, and transmits information of the publisher associated with the winning claim to the advertiser 820.

Figure 9:
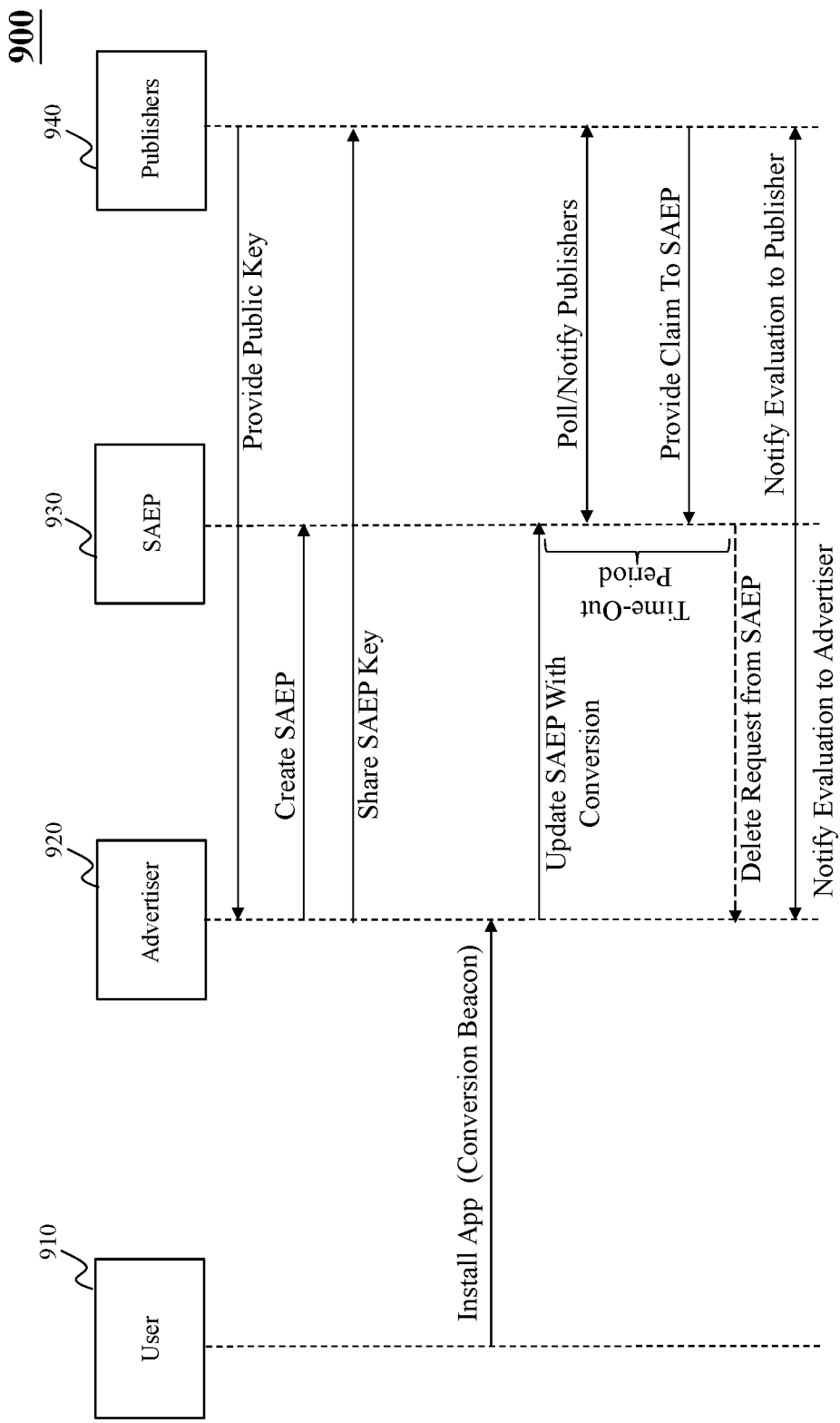
FIG. 9 illustrates another protocol scheme of an attribution process, in accordance with an embodiment of the present teaching.

FIG. 9 illustrates another protocol scheme 900 of an attribution process, in accordance with an embodiment of the present teaching. In this exemplary scheme, there comprises four parties involved in the attribution process, including user(s) 910, an advertiser 920, a SAEP 930, and publishers 940. As stated previously, by one embodiment, the SAEP may be implemented on a Blockchain. For sake of convenience, it is assumed that the advertiser 920 communicates only with a set of known publishers 940 (e.g., Yahoo, Google, and Facebook). Further, the conversion with respect to the attribution process of FIG. 9 is assumed to be one of a downloading of an application by the user(s) 810 on their respective mobile devices. Thus, the framework as depicted in FIG. 9 may correspond to communication that occurs between entities in a closed loop Blockchain.

As shown in FIG. 9, the publishers 940 provide the advertiser 920 with a public key. The advertiser generates a SAEP and posts it on the SAEP platform (e.g. Blockchain platform). Thereafter the advertiser transmits a SAEP key to all the publishers. It must be appreciated that the communication between the entities involved in the present scheme is an encrypted communication based on the public key and the SAEP key.

As users install the application (also referred to herein as "app"), the advertiser is notified of the conversion via a beacon signal. According to one embodiment, the advertiser 920 may aggregate multiple conversions, and update the SAEP 930 with the conversions to be claimed by the publishers 940. Alternatively, the advertiser 920 may update the SAEP 930 on a conversion-by-conversion basis (i.e., every conversion is updated in the SAEP individually).

Further, either the SAEP 930 may notify the publishers 940 of the presence of the SAEP on the platform or the publishers 840 may continuously poll the SAEP platform to request the presence of a posted SAEP. Within a time-out period associated with the SAEP, the SAEP receives claims (with respect to each conversion) from the publishers 940. In the event that the SAEP 930 does not receive any claims from the publishers 940, the SAEP 930 may be deleted from the SAEP platform. Alternatively, as stated previously, the time-out period of the SAEP may be extended to allow additional time for the publishers 940 to submit claims to the SAEP.

The SAEP 930 evaluates each claim received from the publishers 940 and determines a winning claim for each conversion. As stated previously, the SAEP determines the winning claim based on a conversion parameter included in the SAEP 930 and the features included in the plurality of claims (i.e., proofs) submitted by the publishers 940. The SAEP 930 further notifies the publisher associated with the winning claim and allocates a reward included in the SAEP 930 to the corresponding publisher. Additionally, the SAEP 930 notifies the advertiser 920 of a successful completion of the attribution evaluation process, and transmits information of the publisher associated with the winning claim to the advertiser 920.

Figure 10:
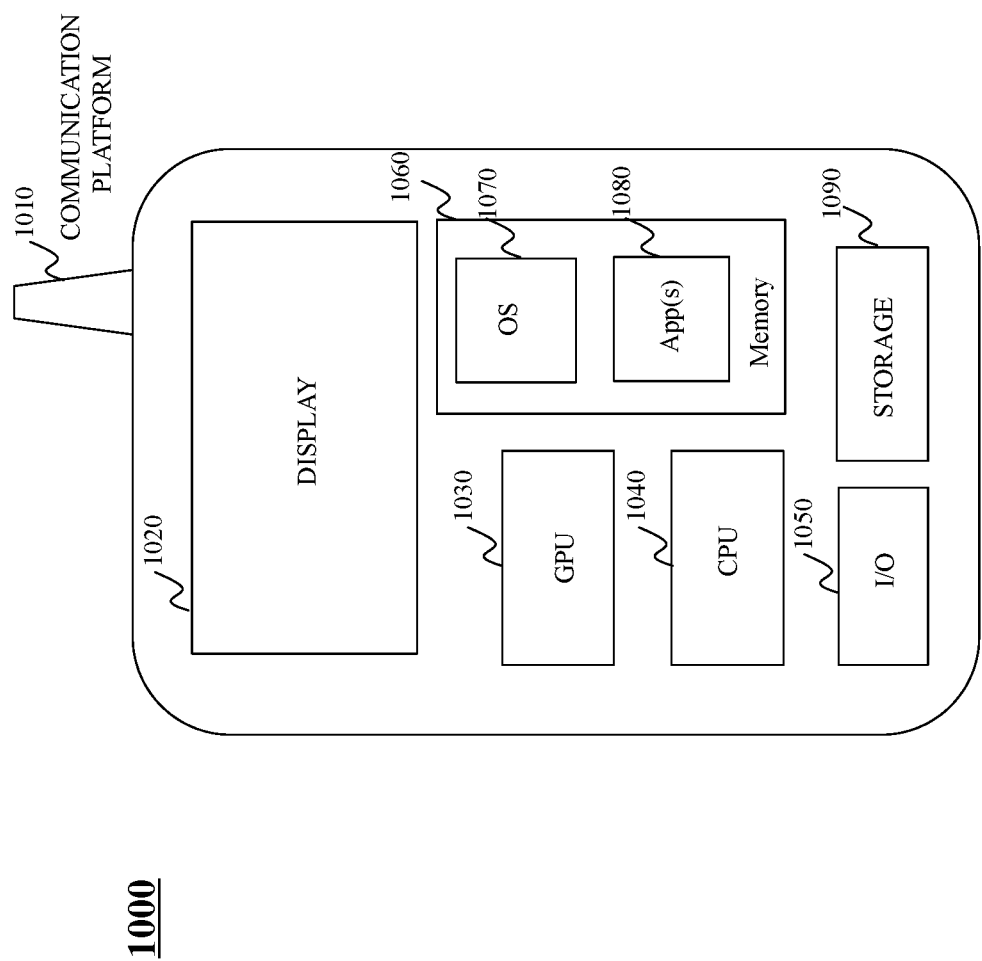
FIG. 10 depicts the architecture of a mobile device, which can be used to implement a specialized system incorporating the present teaching.

Turning now to FIG. 10, there is depicted an architecture of a mobile device 1000 which can be used to realize a specialized system implementing the present teaching. In one example, the user device on which content and advertisement are presented and interacted-with is a mobile device 1000, including, but is not limited to, a smart phone, a tablet, a music player, a handled gaming console, a global positioning system (GPS) receiver, and a wearable computing device (e.g., eyeglasses, wrist watch, etc.), or in any other form factor. Additionally, the mobile device 1000 can be used to implement the functionalities of the smart attribute evaluation package (SAEP) as described herein.

The mobile device 1000 in this example includes one or more central processing units (CPUs) 1040, one or more graphic processing units (GPUs) 1030, a display 1020, a memory 1060, a communication platform 1010, such as a wireless communication module, storage 1090, and one or more input/output (I/O) devices 1050. Any other suitable component, including but not limited to a system bus or a controller (not shown), may also be included in the mobile device 1000. As shown in FIG. 10, a mobile operating system 1070, e.g., iOS, Android, Windows Phone, etc., and one or more applications 1080 may be loaded into the memory 1060 from the storage 1090 in order to be executed by the CPU 1040. The applications 1080 may include a browser or any other suitable mobile apps for receiving and rendering content streams and advertisements on the mobile device 1000, as well as executing the functionalities of the SAEP as discussed herein. User interactions with the content streams and advertisements may be achieved via the I/O devices 1050.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to explore the teachings of the present disclosure. A computer with user interface elements may be used to implement a personal computer (PC) or other type of workstation or terminal device, although a computer may also act as a server if appropriately programmed. It is believed that those skilled in the art are familiar with the structure, programming and general operation of such computer equipment and as a result, the drawings should be self-explanatory.

Figure 11:
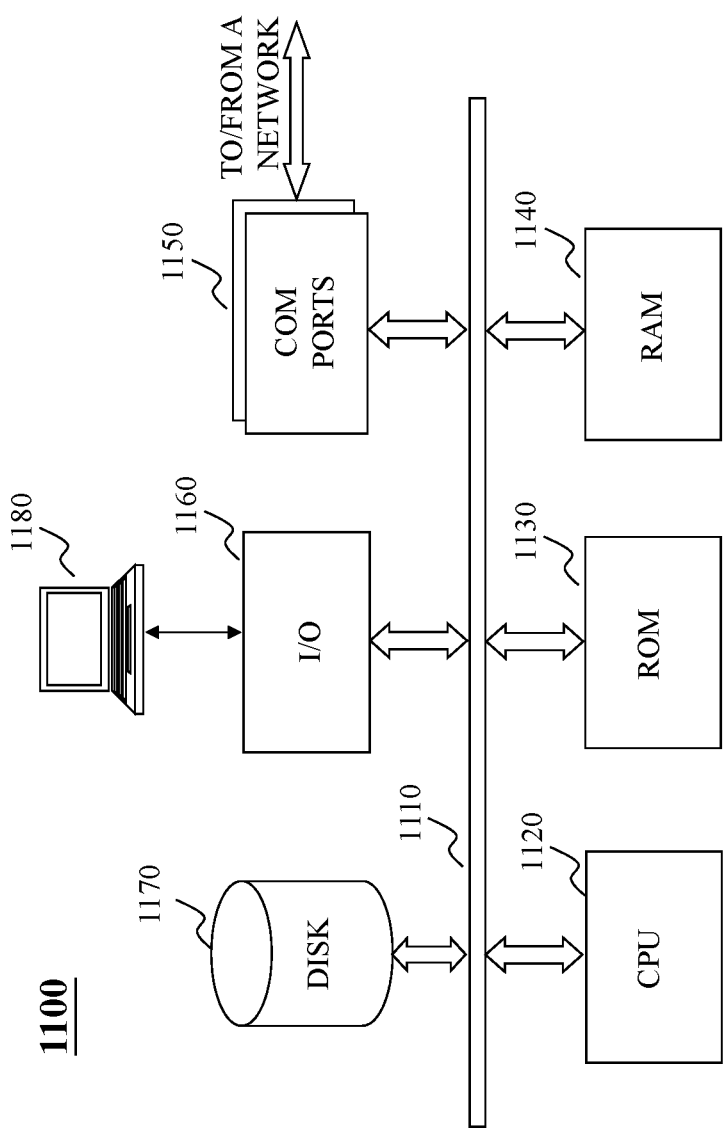
FIG. 11 depicts the architecture of a computer, which can be used to implement a specialized system incorporating the present teaching.

FIG. 11 is an illustrative diagram of an exemplary computer system architecture, in accordance with various embodiments of the present teaching. Such a specialized system incorporating the present teaching has a functional block diagram illustration of a hardware platform, which includes user interface elements. Computer 1100 may be a general purpose computer or a special purpose computer. Both can be used to implement a specialized system for the present teaching. Computer 1300 may be used to implement any component of the advertiser system, the publisher system, and the SAEP as described herein. For example, systems 130, 150, 220, and 310 as described above may be implemented on a computer such as computer 1100 via its hardware, software program, firmware, or a combination thereof. Although only one such computer is shown, for convenience, the computer functions relating to the above stated systems may be implemented in a distributed fashion on a number of similar platforms, to distribute the processing load.

Computer 1100, for example, may include communication ports 1150 connected to and from a network connected thereto to facilitate data communications. Computer 1100 also includes a central processing unit (CPU) 1120, in the form of one or more processors, for executing program instructions. The exemplary computer platform may also include an internal communication bus 1110, program storage and data storage of different forms (e.g., disk 1170, read only memory (ROM) 1130, or random access memory (RAM) 1140), for various data files to be processed and/or communicated by computer 1100, as well as possibly program instructions to be executed by CPU 1120. Computer 1100 may also include an I/O component 1160 supporting input/output flows between the computer and other components therein such as user interface elements 1180. Computer 1100 may also receive programming and data via network communications.

Hence, aspects of the methods for advertisement evaluations, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with evaluating conversions associated with advertisements. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the techniques of evaluating conversions associated with advertisements, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for evaluating a conversion, the method comprising:
   extracting meta-information stored in a smart attribute evaluation package (SAEP) posted by an advertisement server on a closed-loop blockchain and updated by the advertisement server in response to a beacon signal indicating a conversion associated with an advertisement displayed previously by a plurality of publishers, the meta-information comprising a time-out period and a conversion parameter for evaluating the conversion;
   determining, within the closed-loop blockchain, by the SAEP, whether one or more claims for the conversion are received from one or more of the plurality of publishers within the time-out period;
   if no claim is received within the time-out period, sending, within the closed-loop blockchain, by the SAEP to the advertisement server, a request to terminate the SAEP associated with the advertisement from the closed-loop blockchain; and
   if one or more claims are received within the time-out period,
      selecting, within the closed-loop blockchain, by the SAEP, a winning claim from the one or more claims based on the conversion parameter and the received claims, and
      transmitting, within the closed-loop blockchain, by the SAEP to the advertisement server, information related to the winning claim.

2. The method of claim 1, further comprising:
   if one or more claims are received within the time-out period, allocating, by the SAEP, a reward to the publisher corresponding to the winning claim.

3. The method of claim 1, wherein the conversion parameter includes a time stamp of the conversion.

4. The method of claim 1, wherein,
   each of the plurality of claims includes an attribute associated with the conversion, and
   the winning claim is selected based on matching the attribute with the conversion parameter.

5. The method of claim 1, further comprising:
   if one or more claims are received within the time-out period, transmitting the information related to the winning claim to the publisher identified as the source of the conversion.

6. The method of claim 1, further comprising:
   if one or more claims are received within the time-out period, transmitting the information related to the winning claim to one or more of a third-party service provider, an offline or online seller, and a manufacturer.

7. The method of claim 1, further comprising:
   if no claim is received within the time-out period, receiving an updated time-out period.

8. A system for evaluating a conversion, the system comprising:
   an advertiser;
   a plurality of publishers; and
   a smart attribute evaluation package (SAEP) from a closed-loop blockchain configured to perform:
   extracting meta-information stored in the SAEP posted by an advertisement server on the closed-loop blockchain and updated by the advertisement server in response to a beacon signal indicating a conversion associated with an advertisement displayed previously by a plurality of publishers, the meta-information comprising a time-out period and a conversion parameter for evaluating the conversion;
   determining, within the closed-loop blockchain, whether one or more claims for the conversion are received from one or more of the plurality of publishers within the time-out period;
   if no claim is received within the time-out period, sending, within the closed-loop blockchain, by the SAEP to the advertisement server, a request to terminate the SAEP associated with the advertisement from the closed-loop blockchain; and
   if one or more claims are received within the time-out period,
   selecting, within the closed-loop blockchain, a winning claim from the one or more claims based on the conversion parameter and the received claims, and
   transmitting, within the closed-loop blockchain, to the advertisement server, information related to the winning claim.

9. The system of claim 8, further comprising:
   if one or more claims are received within the time-out period, allocating a reward to the publisher corresponding to the winning claim.

10. The system of claim 8, wherein the conversion parameter includes a time stamp of the conversion.

11. The system of claim 8, wherein,
   each of the plurality of claims includes an attribute associated with the conversion, and
   the winning claim is selected based on matching the attribute with the conversion parameter.

12. The system of claim 8, wherein the SAEP is configured to further perform:
   if one or more claims are received within the time-out period, transmitting the information related to the winning claim to the publisher identified as the source of the conversion.

13. The system of claim 8, wherein the SAEP is configured to further perform:
   if one or more claims are received within the time-out period, transmitting the information related to the winning claim to one or more of a third-party service provider, an offline or online seller, and a manufacturer.

14. The system of claim 8, wherein the SAEP is configured to further perform:
if no claim is received within the time-out period, receiving an updated time-out period.

15. A non-transitory machine-readable medium having information recorded thereon for evaluating a conversion, wherein the information, when read by a machine, causes the machine to perform following:
extracting meta-information stored in a smart attribute evaluation package (SAEP) posted by an advertisement server on a closed-loop blockchain and updated by the advertisement server in response to a beacon signal indicating a conversion associated with an advertisement displayed previously by a plurality of publishers, the meta-information comprising a time-out period and a conversion parameter for evaluating the conversion;
determining, within a closed-loop blockchain, whether one or more claims for the conversion are received from one or more of the plurality of publishers within the time-out period;
if no claim is received within the time-out period, sending, within the closed-loop blockchain, by the SAEP to the advertisement server, a request to terminate the SAEP associated with the advertisement from the closed-loop blockchain; and
if one or more claims are received within the time-out period,
selecting, within the closed-loop blockchain, a winning claim from the one or more claims based on the conversion parameter and the received claims, and
transmitting, within the closed-loop blockchain, to the advertisement server, information related to the winning claim.

16. The non-transitory machine-readable medium of claim 15, wherein the conversion parameter includes a time stamp of the conversion.

17. The non-transitory machine-readable medium of claim 15, wherein,
each of the plurality of claims includes an attribute associated with the conversion, and
the winning claim is selected based on matching the attribute with the conversion parameter.

18. The non-transitory machine-readable medium of claim 15, wherein the information, when read by the machine, causes the machine to perform following:
if one or more claims are received within the time-out period, transmitting the information related to the winning claim to the publisher identified as the source of the conversion.

19. The non-transitory machine-readable medium of claim 15, wherein the information, when read by the machine, causes the machine to perform following:
if one or more claims are received within the time-out period, transmitting the information related to the winning claim to one or more of a third-party service provider, an offline or online seller, and a manufacturer.

20. The non-transitory machine-readable medium of claim 15, wherein the information, when read by the machine, causes the machine to perform following:
if no claim is received within the time-out period, receiving an updated time-out period.

* * * * *